US012689449B2

(12) United States Patent
Khasgiwala et al.

(10) Patent No.: US 12,689,449 B2
(45) Date of Patent: Jul. 21, 2026

(54) INTELLIGENT NOISE MITIGATION FOR ELECTRONIC DEVICES

(71) Applicant: Applied Materials, Inc., Santa Clara, CA (US)

(72) Inventors: Mudit Sunilkumar Khasgiwala, Milpitas, CA (US); Subramani Kengeri, Saratoga, CA (US)

(73) Assignee: Applied Materials, Inc., Santa Clara, CA (US)

( * ) Notice: Subject to any disclaimer, the term of this patent is extended or adjusted under 35 U.S.C. 154(b) by 388 days.

(21) Appl. No.: 17/811,369

(22) Filed: Jul. 8, 2022

(65) Prior Publication Data

US 2023/0009222 A1 Jan. 12, 2023

Related U.S. Application Data

(60) Provisional application No. 63/220,394, filed on Jul. 9, 2021.

(51) Int. Cl.
*H04B 15/00* (2006.01)

(52) U.S. Cl.
CPC .................................... *H04B 15/00* (2013.01)

(58) Field of Classification Search
CPC ............................................... H04B 15/00–02
See application file for complete search history.

(56) References Cited

U.S. PATENT DOCUMENTS

| | | | | |
|---|---|---|---|---|
| 7,129,748 | B1 * | 10/2006 | McCollum ....... | H03K 19/17728 |
| | | | | 326/38 |
| 8,334,729 | B1 * | 12/2012 | Khlat ....................... | H03H 7/38 |
| | | | | 333/32 |
| 2003/0025646 | A1 | 2/2003 | Chung et al. | |
| 2006/0164318 | A1 | 7/2006 | Lastinger et al. | |

(Continued)

FOREIGN PATENT DOCUMENTS

| | | |
|---|---|---|
| CN | 106370939 A | 2/2017 |
| KR | 20150022795 A | 3/2015 |

OTHER PUBLICATIONS

International Search Report and Written Opinion mailed on Nov. 7, 2022 in International Patent Application No. PCT/US2022/036480, 8 pages.

(Continued)

*Primary Examiner* — Raymond S Dean
(74) *Attorney, Agent, or Firm* — Kilpatrick Townsend & Stockton LLP

(57) ABSTRACT

A method for controlling noise on an electronic device may include determining that a measured characteristic, associated with an antenna in a first configuration and included on the electronic device, violates a predetermined threshold. The method may also include identifying an aggressor in a second configuration, which may be a component on the electronic device. The aggressor may emit electromagnetic (EM) radiation that causes the measured characteristic to violate the predetermined threshold. One or more stimuli may be determined based on the first and/or second con- (Continued)

figurations that would cause the measured characteristic to no longer violate the predetermined threshold. One or more stimuli may be applied to the antenna and/or the aggressor, causing the measured characteristic to no longer violate the predetermined threshold.

20 Claims, 17 Drawing Sheets

(56)                  References Cited

U.S. PATENT DOCUMENTS

| | | | |
|---|---|---|---|
| 2006/0189033 A1* | 8/2006 | Kim ................... H01L 23/3128 | 257/E21.705 |
| 2010/0073219 A1* | 3/2010 | He ........................ H04B 17/23 | 342/173 |
| 2010/0214030 A1* | 8/2010 | McDonald ............. H03L 1/022 | 331/34 |
| 2012/0194393 A1 | 8/2012 | Uttermann et al. | |
| 2014/0187187 A1 | 7/2014 | Alcocer Ochoa et al. | |
| 2015/0155623 A1 | 6/2015 | Shamblin et al. | |
| 2015/0244478 A1* | 8/2015 | Shirakata ............. H04B 17/309 | 370/252 |
| 2016/0197669 A1* | 7/2016 | Babich ............... H04B 7/18504 | 370/315 |
| 2017/0108589 A1* | 4/2017 | Doyle .................. G01R 31/002 | |
| 2017/0237143 A1* | 8/2017 | Chan ...................... H01P 1/208 | 333/229 |
| 2017/0331447 A1* | 11/2017 | Lee ...................... H04B 1/0458 | |
| 2018/0316379 A1 | 11/2018 | Chang et al. | |
| 2020/0009661 A1* | 1/2020 | Young ................... B33Y 70/00 | |
| 2020/0329554 A1* | 10/2020 | Verdugo Muñoz ...... G01R 1/18 | |

OTHER PUBLICATIONS

Extended European Search Report for Application No. 22838462. 4-1206, mailed on Apr. 15, 2025, 7 pages.
European Application No. 22838462.4, Intention to Grant mailed on Feb. 13, 2026, 7 pages.
Application No. KR10-2024-7004372 , Office Action, Mailed On Apr. 30, 2026, 16 pages.

* cited by examiner

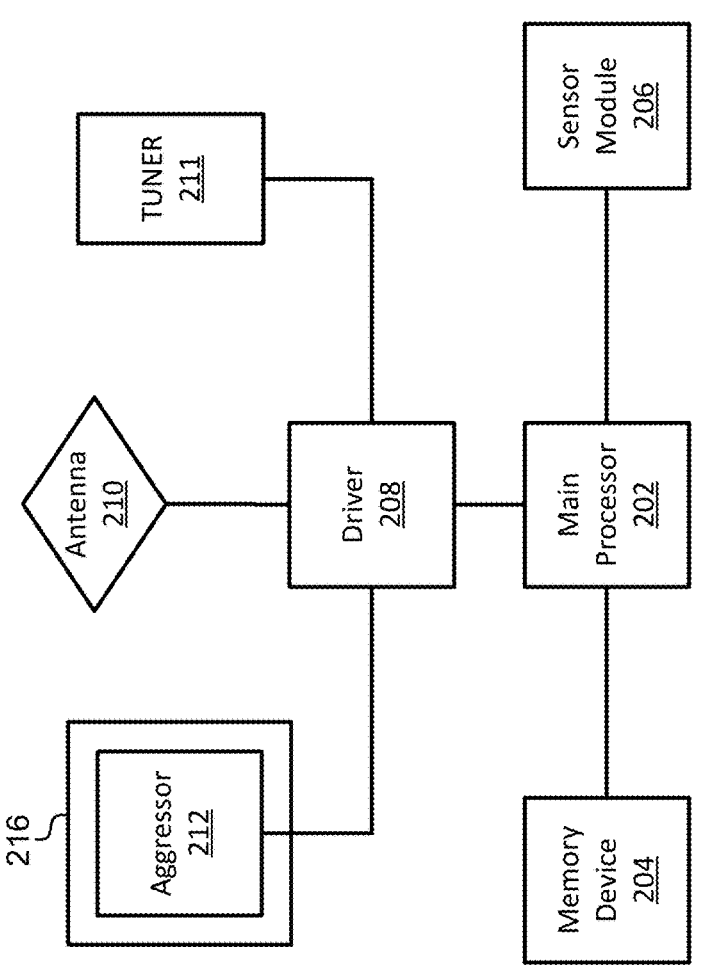
FIG. 2

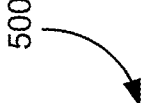
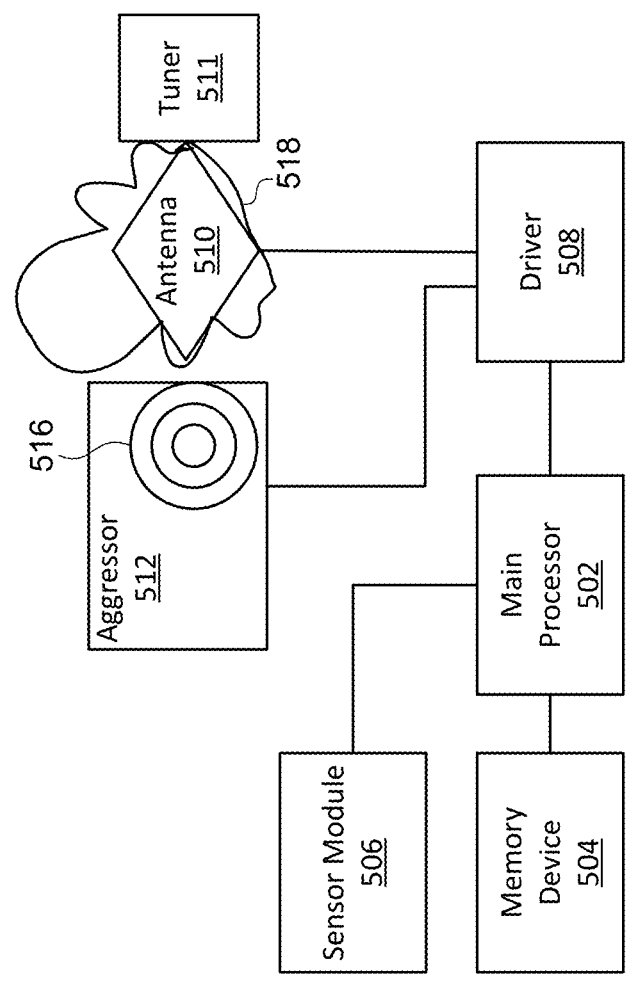
FIG. 5

600

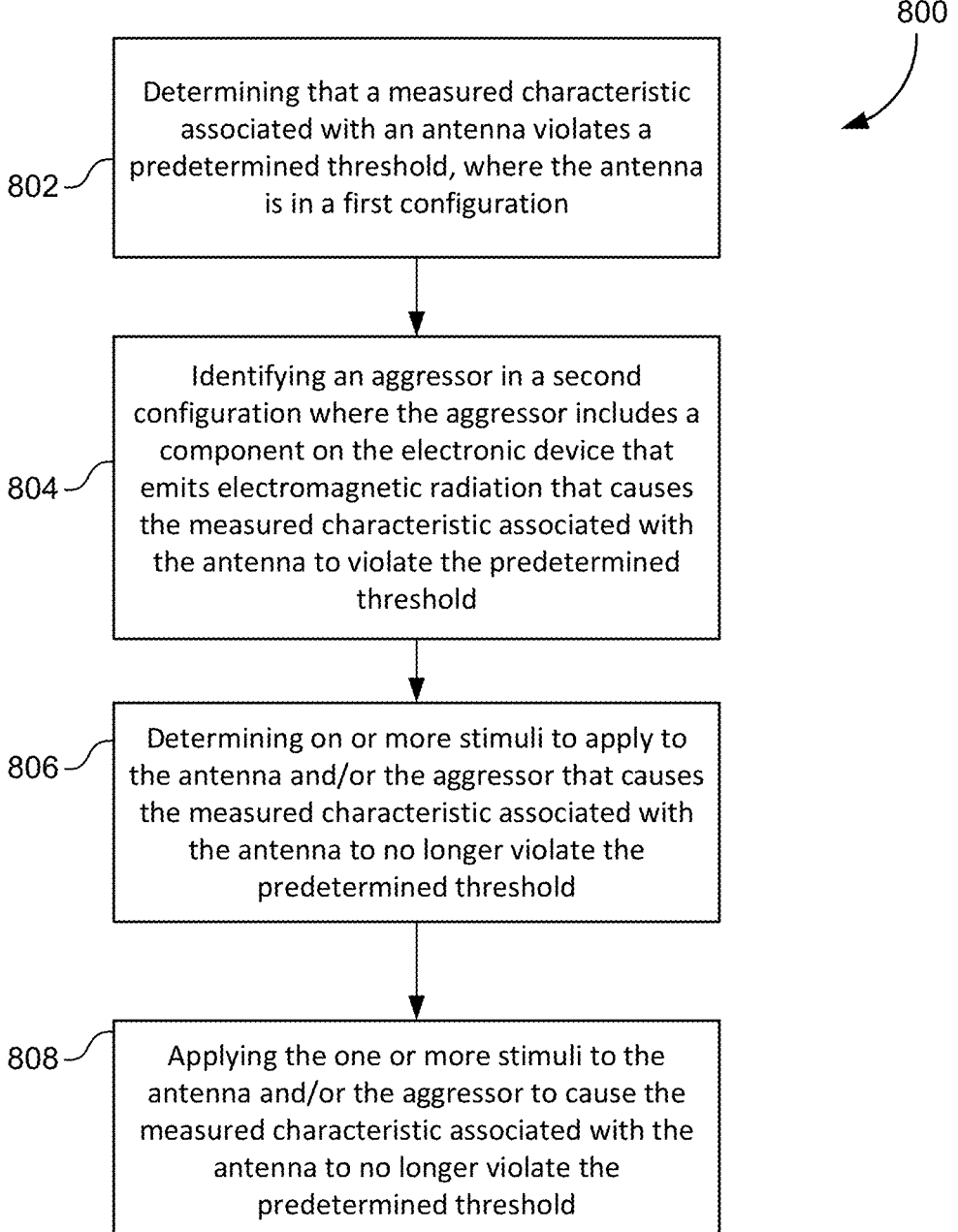

800

802 — Determining that a measured characteristic associated with an antenna violates a predetermined threshold, where the antenna is in a first configuration 804 — Identifying an aggressor in a second configuration where the aggressor includes a component on the electronic device that emits electromagnetic radiation that causes the measured characteristic associated with the antenna to violate the predetermined threshold 806 — Determining on or more stimuli to apply to the antenna and/or the aggressor that causes the measured characteristic associated with the antenna to no longer violate the predetermined threshold 808 — Applying the one or more stimuli to the antenna and/or the aggressor to cause the measured characteristic associated with the antenna to no longer violate the predetermined threshold

FIG. 8

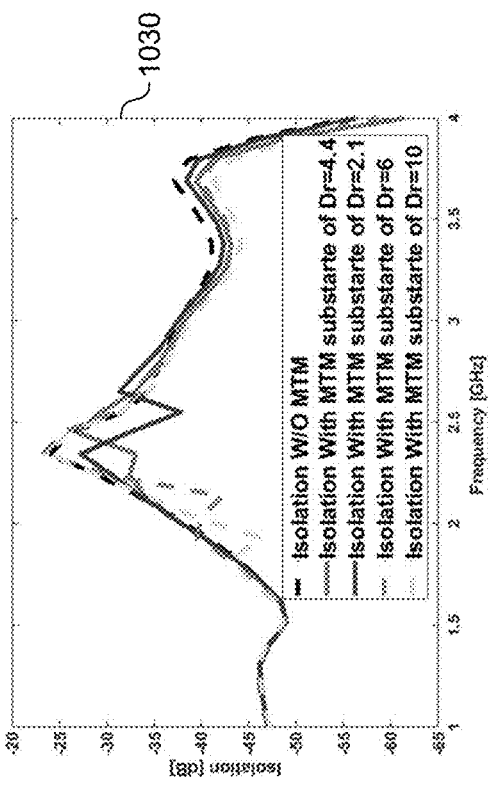
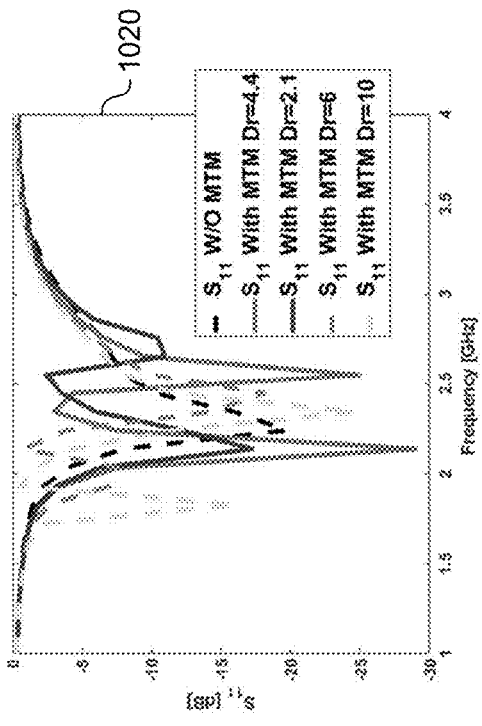
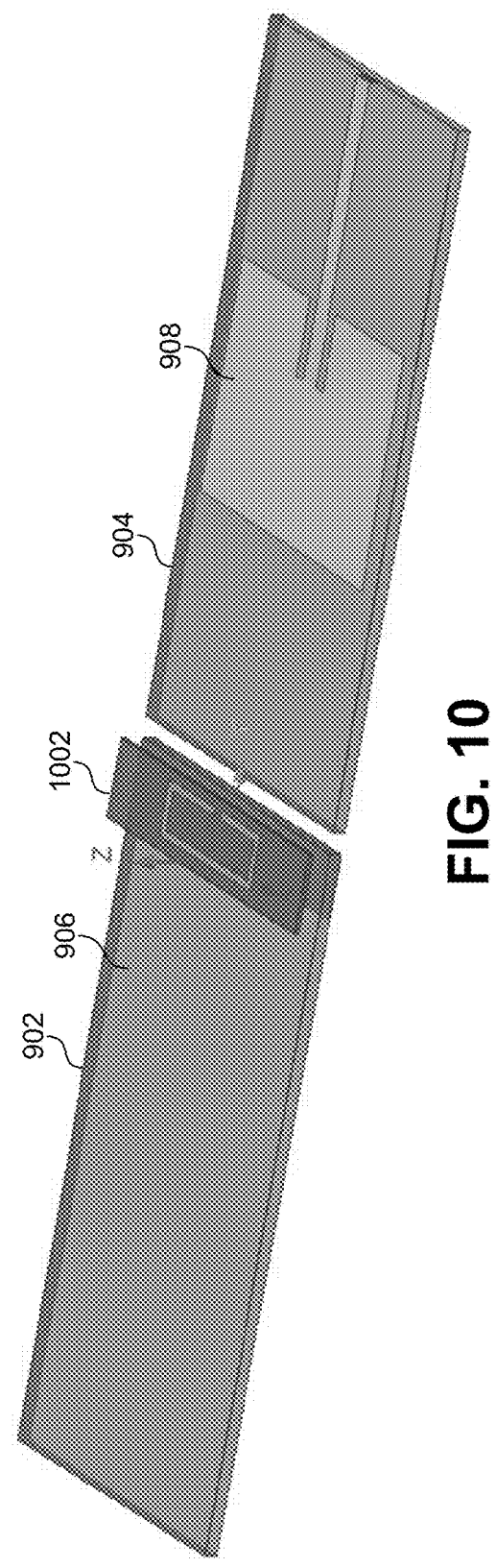
FIG. 10

INTELLIGENT NOISE MITIGATION FOR ELECTRONIC DEVICES

CROSS-REFERENCES TO RELATED APPLICATIONS

This application claims the benefit of U.S. Provisional Patent Application 63/220,394, filed Jul. 9, 2021, entitled "INTELLIGENT NOISE MITIGATION FOR ELECTRONIC DEVICES," the entire disclosure of which is hereby incorporated by reference, for all purposes, as if fully set forth herein.

TECHNICAL FIELD

This disclosure generally relates to methods and systems for mitigating noise and other unwanted effects of electromagnetic radiation on an electronic device. More specifically, this disclosure describes techniques for designing and operating components on an electronic device to mitigate electromagnetic interference, enhance security, and achieve enhanced performance.

BACKGROUND

Electronic devices, particularly those with antennas and/or receivers, may experience issues with electromagnetic (EM) radiation in the form of noise and interference, leading to performance and security issues. The configuration of an antenna and/or an aggressor can impact the severity of these issues. Generally, the configuration of an antenna and an aggressor is set during the design-phase. There is a need to enable the configuration to be modified quickly during normal operation of the electronic device in order to mitigate noise.

BRIEF SUMMARY

In some embodiments, a method for controlling noise on an electronic device may include determining that a measured characteristic, associated with an antenna in a first configuration and included on the electronic device, violates a predetermined threshold. The method may also include identifying an aggressor in a second configuration, which may be a component on the electronic device. The aggressor may emit electromagnetic (EM) radiation that causes the measured characteristic to violate the predetermined threshold. One or more stimuli may be determined based on the first and/or second configurations that would cause the measured characteristic to no longer violate the predetermined threshold. One or more stimuli may be applied to the antenna and/or the aggressor, causing the measured characteristic to no longer violate the predetermined threshold.

In some embodiments, a non-transitory computer readable medium may include instructions that cause one or more processors to perform operations. The operations may include determining that a measured characteristic associated with an antenna in a first configuration and included on the electronic device, violates a predetermined threshold. The method may also include identifying an aggressor in a second configuration, which may be a component on the electronic device. The aggressor may emit electromagnetic (EM) radiation that causes the measured characteristic to violate the predetermined threshold. One or more stimuli may be determined based on the first and/or second configurations. One or more stimuli may be applied to the antenna and/or the aggressor that causes the measured characteristic to no longer violate the predetermined threshold.

In some embodiments, a system may include an electronic device. The electronic device may include an antenna in a first configuration, and an aggressor, which may be another component on the electronic device that emits EM radiation. The system may also include a driver operable to apply one or more stimuli to a plurality of components on the electronic device. The system may also include a non-volatile memory device which may include a data structure. The data structure may store information concerning a plurality of characteristics associated with the antenna and one or more configurations. The system may also include one or more processors configured to execute instructions. The instructions may include determining that a measured characteristic associated with the antenna violates a predetermined threshold. The instructions may also include identifying the aggressor in a second configuration. The aggressor may emit electromagnetic (EM) radiation that causes the measured characteristic to violate the predetermined threshold. The instructions may include accessing data from the structure. The data may include information associated with the measured characteristic, the first configuration, and the second characteristic. The instructions may include determining one or more stimuli based on the first and/or second configurations. One or more stimuli may be then applied to the antenna and/or the aggressor that causes the measured characteristic to no longer violate the predetermined threshold.

In all embodiments, the first configuration of the antenna may include a location on the electronic device and a tuner. The tuner may be an impedance tuner and/or and aperture tuner. The tuner may further be a microelectromechanical (MEMS)-actuated tuner. The MEMS-actuated tuner may include an electrostatic MEMS actuator.

In all embodiments, the antenna may be fabricated using one or more meta materials. Suitable meta-materials may include semi-conducting materials, ferromagnetic materials, and phase-change materials. The meta material may change one or more EM properties of the antenna in response to one or more stimuli.

In all embodiments, the aggressor shielding material may be fabricated using one or more smart materials. Suitable smart materials may include shape-memory alloys, piezo-electric materials, a magnetic shape memory alloy, and a smart inorganic polymer. The smart material may be characterized by a change in shape and/or an EM property.

In all embodiments, the measured characteristic may include a signal-to noise ratio (SNR). The application of one or more stimuli may cause a third configuration, resulting in a shift in the direction of a signal being emitted by the antenna. This shift may cause the SNR to no longer violate the predetermined threshold.

In all embodiments, the measured characteristic may include a bite error rate check with a first success rate that violates a predetermined threshold due to an EM noise emitted by the aggressor. The application of one or more stimuli may cause a third configuration. The third configuration may attenuate the EM noise and cause a second success rate which no longer violates the predetermined threshold.

In all embodiments, the measured characteristic may include an EM field that causes interference with a radiative pattern associated with the operation of the antenna. The application of one or more stimuli may result in a third configuration. The third configuration may result in a shift in the radiative pattern, mitigating the interference to a level that no longer violates the predetermined threshold.

In all embodiments, the first configuration may include information including the location of the antenna on the electronic device and a tuner. The second configuration may include the location of an aggressor on the electronic device and the aggressor shielding material associated with the aggressor. The data structure may include a look-up table (LUT) including information associated with the first and second configurations. The LUT may include data associated with materials used to fabricate the antenna and data associated with the materials used to fabricate the aggressor shielding material.

BRIEF DESCRIPTION OF THE DRAWINGS

FIG. 2 illustrates a simplified example of an electronic device where intelligent noise mitigation may be utilized, according to some embodiments.

FIG. 5 illustrates an electronic device wherein an aggressor is emitting an electromagnetic EM field which no longer interferes with a radiative pattern of an antenna, according to some embodiments.

FIG. 8 illustrates a flowchart of a method for mitigating electromagnetic (EM) radiation on an electronic device, according to an embodiment.

FIG. 10 illustrates a configuration using a meta-material with the victim, according to some embodiments.

DETAILED DESCRIPTION

Figure 1A:
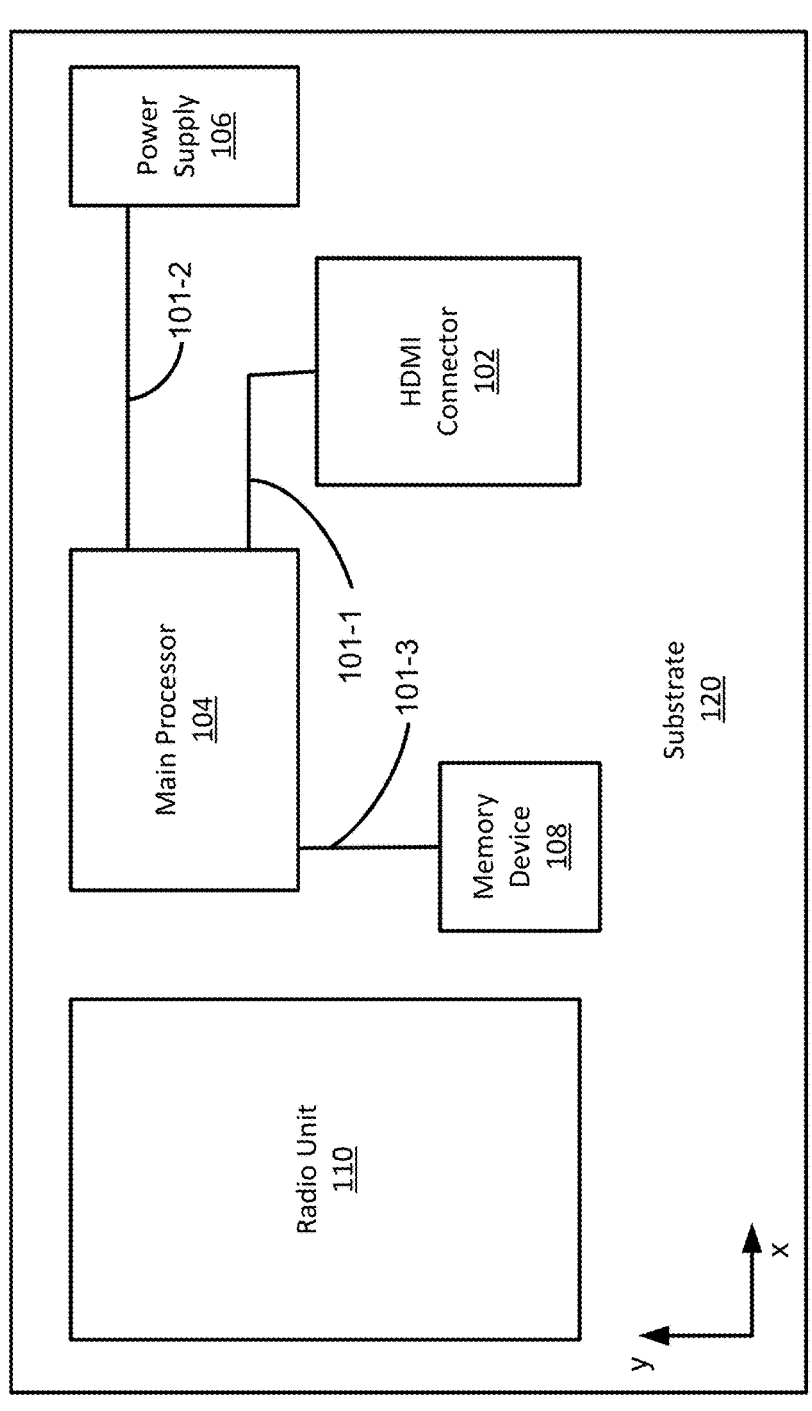
FIG. 1A illustrates an example of an electronic device wherein various components may emit unwanted EM radiation, according to some embodiments.

Electronic devices face challenges in mitigating electromagnetic (EM) effects due to noise, EM interference (EMI), and other issues. EMI can disrupt components included in the electronic device, whether the EMI comes from other components included in the same device or from some other external source. EMI may also be electromagnetic noise (sometimes referred to as "noise") is an unintended emission of EM radiation due to the operation of componentry on an electronic device, such as thermal noise. Thermal noise is caused by the excitation of charge carriers within components of an electronic device. This noise may cause components of an electronic device to emit EM radiation within a certain frequency band, causing similar effects on other components of the electronic device as EMI. Furthermore, noise can lead to security concerns. Leaked noise from an electronics device can sometimes be exploited in a side channel attack. The noise may be from a component purposefully carrying information within the device or may be from an unintended antenna. These effects can lead to a degradation in a signal emitted or received by the electronic device. An electronic device may be configured such that EM effects are minimized and the emitted or received signal is within a predetermined threshold at design time. Yet while operating in a non-test environment, there may be a need to adjust the configuration of one or more components on the electronic device such that operational signals are maintained appropriately.

Embodiments described herein intelligently control the configuration of one or more components to mitigate noise-related issues on an electronic device. Locations of aggressors and antennas may be identified during a design phase. The antennas may be designed using meta-materials, which allow for active control of one or more EM properties of the antenna. The locations of aggressors may be shielded using one or more smart materials, allowing for active control of one or more EM properties of the shielded aggressor. One or more stimuli may be applied to the antenna and/or the aggressor shielding material, changing their configuration and one or more EM properties. By controlling one or more EM properties of the aggressor and/or antenna, undesirable EM effects may be mitigated.

Electronic devices and their components can both emit and receive unwanted EM radiation. When electronic devices include antennas that broadcast information through radio waves or other forms of EM radiation, the unintentional reception or emission of EM radiation may cause problems with the integrity of a message to be sent or received.

EMI occurs when an emitter of EM radiation affects an electronic device though various means, including induction, conduction, or electrostatic coupling. EMI may prevent signals from being properly broadcast or received by an electronic device or may interfere with other circuitry in the electronic device. EMI may be emitted by an external source or by noise generated by the electronic device and/or their components. Noise may cause components of an electronic device to emit EM radiation within a certain frequency band. The noise generated by the components from the electronic device itself may have unwanted effects on other components of an electronic device, especially receiving components.

FIG. 1A illustrates an example of an electronic device wherein various components may emit unwanted EM radiation, according to some embodiments. FIG. 1A may represent only portions of a larger device, for example, showing only the wireless and display modules of a larger system. FIG. 1A is provided only as an example and is not meant to be limiting; other electronic devices referred to herein may have all, some, or none of the components shown on FIG. 1.

A High-Definition Multimedia Interface (HDMI) connector 102 may be connected to a main processor 104 via a trace 101-1 on a substrate 120. A power supply 106 and a memory device 108 may be similarly connected to a main processor 104 through the traces 101-1 and 101-2. Although not connected directly to the main processor 104, a radio unit 110 may be mounted on the substrate 120. The radio unit 110 may be used to send and receive data via radio waves, which may be a source of EM radiation or interference.

An "aggressor" may be defined herein as a component which emits undesired EM radiation. Aggressors may include components such as the power supply 106, the HDMI connector 102, and the memory device 108. Any undesired EM radiation emitted may cause a degradation in performance of the electronic device. In some instances, the noise emitted by these components may be the same frequency. In other instances, the noise emitted by each component may be different than the frequency emitted by any of the other components.

Figure 1B:
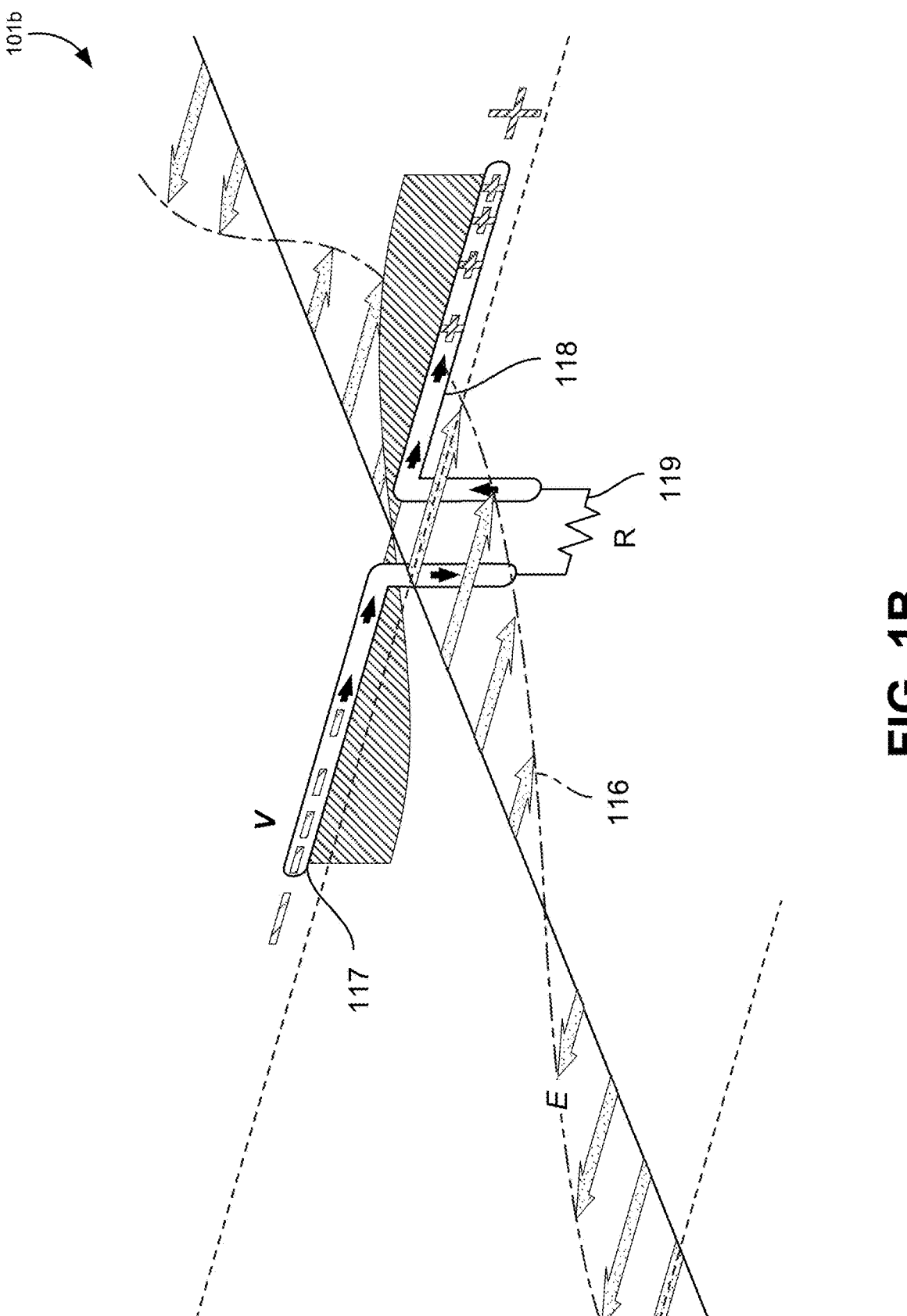
FIG. 1B illustrates a view of a trace which may include an unintentional antenna acting as an aggressor, according to some embodiments.

FIG. 1B illustrates a view of the trace 101-2, which may include an unintentional antenna acting as an aggressor, according to some embodiments. While the trace 101-2 is shown as an example, any trace may act as an antenna. Additionally, the substrate 120 may have additional traces (not shown) that may also act as an unintentional antennas. A radio wave 116 is shown as an electromagnetic field. In some embodiments, the radio wave 116 may be emitted by the electronic device 100 via the radio unit 110. A first trace arm 117 and a second trace arm 118 are shown to be of equal length, approximately one-half of the wavelength of the radio wave 116. The first trace arm 117 and the second trace arm 118 are joined by a resistor 119, where the length of the resistor 119 is significantly smaller than the length of the first trace arm 117 and the second trace arm 118. On some electronic devices, the first trace arm 117 and the second trace arm 118 may be different segments of the same trace connected by some component. The first trace arm 117 and the second trace arm 118 may be portions of separate traces connected either intentionally or unintentionally by an interposer layer or component.

As the trace 101-2 is an electrical conductor, both the first trace arm 117 and the second trace arm 118 are also conductors. The radio wave 116 interacts with the first trace arm 117 and the second trace arm 118 and a voltage is created across the length of both trace arms. As the radio wave 116 oscillates, the voltage across the first trace arm 117 and the second trace arm 118 oscillates at the same frequency. Because there is a voltage across the length of the trace arms and they are connected by a resistor, current flows back and forth and noise may be generated, oscillating at or near the same frequency as radio wave 116. Thus, the trace 101-2 acts as an unintentional antenna broadcasting radio wave 116. This configuration is not the only possible configuration of an unintentional antenna. One of ordinary skill in the art would recognize many different configurations that may allow the radio wave 116 being emitted unintentionally.

In some embodiments, locations on the electronic device including antennas such as radio unit 110 and locations of other aggressors such as the power supply 106 and the trace

101-2 may be identified by a computing device during a design phase of an electronic device. Locations including λ/4 points may also be identified, where λ is the wavelength associated with a frequency of EM radiation. The λ/4 points may act as resonant points, effectively repeating undesired EM radiation from an antenna or an aggressor. Thus, the λ/4 points may also be aggressors. For example, the radiation patterns and impedances (S11/VSWR) across frequencies of interest may be measured for any resonating structures acting as antennas in an EM simulation domain. This may provide radiation pattern lobes, amplitudes, and phases for each of these noise sources. Signal traces that may generate noise during operation may also be identified and modeled/measured in the EM mapping, such as high speed clock lines, transmission lines using high data rates, and/or power supply planes.

The locations of the antennas and the aggressors may be identified by performing electromagnetic scans of a model of the electronic device. As a result of the EM scans, the computing device may determine that one or more characteristics associated with the antenna violate a predetermined threshold. For example, the EM hot spots may be identified and measured/modeled for any of the shielded aggressor locations. This may be generated from EM simulations or EM scans of the device in 2D or 3D dimensions (e.g., x, y and z directions to generate Hx, Hy and Hz components at target frequencies). In addition to mapping the aggressor locations, the antenna locations may also be mapped. For example, EM properties including radiation patterns, lobe amplitudes, phases, beam widths, directivity, and S11 measurements of the device antennas at each operating frequency and direction may be simulated or measured and recorded in a data structure in a nonvolatile memory on the device. This creates a mapping of the EM radiation characteristics and noise propagation for any of the aggressors or antennas on the device to record the know EM fields, impedances, current distributions, and/or measurements of shielding effectiveness.

The computing device may then determine a material choice for the antenna. In some embodiments, the material choice may be a meta material, including liquid crystal, graphene, ferroelectric materials such as LiNbO3 and BST, chalcogenide, VO2, and semiconductor materials. The model may then be updated and the material choice and associated properties entered into a data structure, such as a look-up table (LUT). The LUT may store key parameters for the shielding materials and/or the antennas on the electronic device that is determined in the simulated environment and/or a prototype or testing environment using EM sensors and scans. For example, the LUT may store characteristics such as shielding effectiveness (S21, isolation or leakage), S11, Lambda/4 for maximum radiation, lambda/10 for minimum radiation, magnetic current density components including Hx, Hy, Hz, antenna radiation pattern/lobes, magnitudes, phases, beam widths, directivity of antennas and other beam properties, other material properties including Dk, Df, CTE, Young's modulus, and other electrical or physical parameters.

The computing device may then determine an aggressor shielding material. For example, shielding material may be selected and applied to minimize the measured or simulated EM interference. In some embodiments, the aggressor shielding material may be a "smart" material. Smart materials may include shape-memory alloys (SMAs), whose properties may be changed by the application of pressure. Examples of SMAs include Nitinol, NiTi, and Cu–Al+Ni alloys including Zn, Cu, Au, and Fe. Smart materials may also include piezoelectric materials, characterized by associated coefficients of thermal expansion (CTE), Young's modulus, and other deformation and radiative characteristics. Smart materials may also include magnetic shape memory alloys (MSMA) which change their physical shape in response to a change in a surrounding magnetic field. Examples of MSMAs include NiMnGa+Cu, Co, or Fe. Smart materials may further include smart inorganic polymers including polysiloxanes, poly-protDOT-Me2, polystannanes, and polyferrocenylsilane. Other smart materials may be characterized herein as a material that may change in shape and/or in one or more EM properties in response to a stimulus.

In addition to iteratively selecting an applying the shielding material for the aggressors, some embodiments may also iteratively update the antenna designs and materials to minimize EM interference. For example, antenna designs may be modified and simulated using meta-materials, MEMS tuners and/or regular tuners for adjusting aperture and/or impedance of the antennas. These materials may be changed at design time, iterated, and simulated/measured to reduce the EM interference. Control the shielding materials and antenna meta-material properties may be done statically in a "passive mode" during design time and/or dynamically in an "active mode" at runtime based on receiver feedback and precise control of the actuators. Passive mode control may be static performed prior to application of the shielding material density at localized problem areas by (1) augmenting the density or thickness of the material, or (2) changing the shape of material based on the simulation and EM scan methods at known hot spots in the EM mapping. This represents an "open loop" noise mitigation technique that uses the simulated and/or measured effects of the shielding material and the material electrical property modulation of the antenna designs to iterate on the design of the electronic device. This open feedback loop control decision may be implemented based on a programmed level of accuracy that considers a hysteresis effect. Threshold levels of inaccuracy and hysteresis that trigger changes in the design are programmable in software tools.

The model may be updated with the aggressor shielding material and the aggressor shielding material and associated properties may be entered into the LUT. The process of scanning the model, updating antenna design and aggressor shielding, and entering the associated properties into the LUT may be repeated until all characteristics no longer violate a predetermined threshold. For a more detailed description of this process, see related application No. 63/213,553, filed on Jun. 22, 2021, which is hereby incorporated by reference in its entirety.

FIG. 2 illustrates a simplified example of an electronic device where intelligent noise mitigation may be utilized, according to some embodiments. The electronic device 200 may be produced according to the design-phase described above. A main processor 202 may be electrically connected to a memory device 204. A sensor module 206 may be electrically connected to the main processor 202. A driver 208 may be operable receive instructions from the main processor 202 and to send one or more stimuli to an antenna 210 and/or an aggressor 212. The antenna 210 may include a first configuration and a tuner 211. The aggressor 212 may be a component on the electronic device 200, an unintentional antenna, a λ/4 resonant point, or another emitter of unwanted EM radiation. The aggressor 212 may also be in a second configuration and include an aggressor shielding material 216, deposited on the aggressor 212 as determined during the design phase described above.

The first configuration may include information about a location of the antenna 210 and the fabrication of the antenna 210. The antenna 210 may be fabricated from a meta-material, characterized by a change in shape and/or one or more EM properties in response to a stimuli. A meta-material may include liquid crystal, graphene, ferroelectric materials such as LiNbO3 and BST, chalcogenide, VO2, and semiconductor materials. One or more meta-materials may be used to fabricate the antenna 210.

The tuner 211 may include a microelectromechanical (MEMS)-actuated tuner as described below, operable to alter EM properties of antenna 210 by delivering stimuli to the meta-material. A MEMS-actuated tuner may include an electrostatic actuator, an electrothermal actuator, and/or a piezoelectric tuner. The tuner 211 may also include an impedance tuner including a screw tuner or stub tune S11 values as return loss and/or impedance of the antenna by changing its physical properties. The tuner 211 may also be circuitry configured to operate as an aperture tuner.

The aggressor shielding material 216 may be a smart material characterized by a change in shape and/or one or more EM properties in response to a stimulus. Smart materials may include shape-memory alloys (SMAs), whose properties may be changed by the application of pressure. Examples of SMAs include Nitinol, NiTi, and Cu–Al+Ni alloys including Zn, Cu, Au, and Fe. Smart materials may also include piezoelectric materials, characterized by associated coefficients of thermal expansion (CTE), Young's modulus, and other deformation and radiative characteristics. Smart materials may also include magnetic shape memory alloys (MSMA) which change their physical shape in response to a change in a surrounding magnetic field. Examples of MSMAs include NiMnGa+Cu, Co, or Fe. Smart materials may further include smart inorganic polymers including polysiloxanes, poly-protDOT-Me2, polystannanes, and polyferrocenylsilane. Other smart materials may be characterized herein as a material that may change in shape and/or in one or more EM properties in response to a stimulus. In some embodiments, the aggressor shielding material may be deposited in two dimensions. The aggressor shielding material may also be deposited in three dimensions.

The sensor module 206 may be operable to measure a plurality of characteristics associated with the antenna 210 and one or more configurations. The plurality of characteristics may include a shape of a radiative pattern, EM field strengths at various frequencies, spurious EM signals, a signal-to-noise ratio (SNR), bit-error rate checks, and other measureable information. In some embodiments, the sensor module 206 may measure one or more of the plurality of characteristics. The one or more configurations may include the layout of components of electronic device 200, normal operating frequencies of the electronic device 200, material composition of the antenna 210 and associated properties, information associated with the tuner 211, information associated with the aggressor shielding material 216, and other relevant information.

The sensor module 206 may measure a characteristic from the plurality of characteristics. The sensor module 206 may send information about the measured characteristic to the main processor 202. The main processor 202 may then access a data structure stored in the memory device 204. In some embodiments, the memory device 204 includes a non-volatile memory device. In some embodiments, the data structure may include a LUT. The data structure may store information generated from the design phase described above. This information may include predetermined thresholds for each of the plurality of characteristics, information associated the one or more configurations, and one or more stimuli associated with one or more configurations.

In some embodiments, the measured characteristic may violate the predetermined threshold. The main processor 202 may determine a third configuration such that the measured characteristic no longer violates the predetermined threshold. In determining a configuration, the main processor may utilize the data accessed from the data structure on the memory device 204 to determine one or more stimuli based on the first and/or second configurations. In some embodiments, the main processor may access pre-populated data from the data table including a stimulus and associated magnitude to apply to a component on the electronic device 200. In other embodiments, the main processor 202 may calculate the magnitude of a stimulus necessary to achieve the third configuration.

In some embodiments, the main processor 202 may determine that only one stimuli is needed for one component, such as the antenna 210. In other embodiments, the main processor 202 may determine more than one stimuli is needed for more than one component, such as the tuner 211, the antenna 210, and the aggressor shielding material 216.

Upon determining one or more stimuli based on the first and/or second configuration, the main processor 202 may send instructions to the driver 208 to send the one or more stimuli to the corresponding component. The driver 208 may send the one or more stimuli to the corresponding component, such as the antenna 210, the tuner 211, or the aggressor shielding material 216. The stimuli may cause a third configuration which results in the measured characteristic no longer violating the predetermined threshold.

In some embodiments, the sensor module 206 may make repeat the measurements of one or more characteristics. The main processor 202 may then access the data structure stored in the memory device 204 and provide instructions to the driver 208, repeating the process until the one or more characteristics no longer violate the predetermined threshold. The driver 208 may apply one or more stimuli to one or more components of the electronic device 200. The stimuli may be based on the first configuration and/or the second configuration, and may cause a third configuration, causing the one or more measured characteristics to no longer violate the associated predetermined threshold. In some embodiments, this process may continue while the electronic device is in operation.

The components shown in FIG. 2 are meant to illustrate a simplified example of an intelligent noise mitigation system. There may be more or fewer components included on the electronic device 200 than are shown. For example, the sensor module 206 may include multiple sensors, or there may be more than one sensor module included on the electronic device 200. In other embodiments, the sensor module 206 need not be included on the electronic device. A measured characteristic may be known to violate a predetermined threshold during normal operation, for example as was discovered in the design-phase as described above. The main processor may execute instructions that cause the driver to send one or more stimuli to one or more components, for example at the beginning of operation of electronic device 200.

FIGS. 3-7 illustrate specific functionalities included on electronic device 200 according to some embodiments. Although shown separately for clarity, the methods and systems described herein may include one or more of the examples below. These embodiments implement a "closed-loop" feedback process that uses an active feedback loop that corrects actively EM noise is detected during operation based on, for example, SNR or RSSI degradation. This provides a tight and accurate control on the actuation level of the meta-materials in response to an applied stimulus. The closed-loop method is more granular and accurate than the open-loop design-time process described above.

The stimulus applied during the closed-loop process may include a temperature gradient, a thermal resistance, a Coefficient of Thermal Expansion (CTE) with radiation parameters like $\varepsilon r$, $\mu r$, Dk, Df and Geometrical aspects like thickness of conductor, roughness, substrate and RDL, spacing, as these all determine the radiation characteristics). As described above, the design-time process may be used to determine types of SMA materials to be used based on various aspects of the engineering tradeoffs (cost, power consumption, size, yield, practicality of the application, reliability). This SMA shielding may be applied to the aggressors in various EM sputtering process and methods. Additionally, the design-time process may include the selection and application of meta-materials for the antenna design that will provide dynamic control/modulation of the amplitude, phase, beam shape, beam width, radiation pattern, and other physical or electrical characteristics used by the closed-loop process during runtime. As described below, this process provides the ability to control the radiation pattern of an antenna and the characteristics of the SMA material in the shielding.

Among the various tuning mechanisms for meta materials, some embodiments may geometrically change the configurations of the unit cells of the meta-materials to change the effective properties of the meta-materials. This reconfiguration may be enabled actuating schemes in MEMS technology, which can induce a displacement inside or between the unit cells. MEMS actuators provide general tuning methods that can be applied to a broad frequency range from GHz, terahertz (THz) to mid-infrared (MIR) and even visible light. The monolithic integration of the MEMS actuators and meta-materials are compatible with the current CMOS fabrication platforms. Additionally, components like MEMS tuners and RF impedance/aperture tuners can be used in the system to control the selectivity and tunability of the antenna impedance and/or operating frequency for optimal spectral energy radiation in omni-directional or intended-direction radiation patterns at runtime using SPI or GPIO commands to control or actuate the switch or MEMS device to either change the impedance of the antenna with the impedance tuner and/or tune the electrical length of the antenna for varied operating frequencies.

Figure 3:
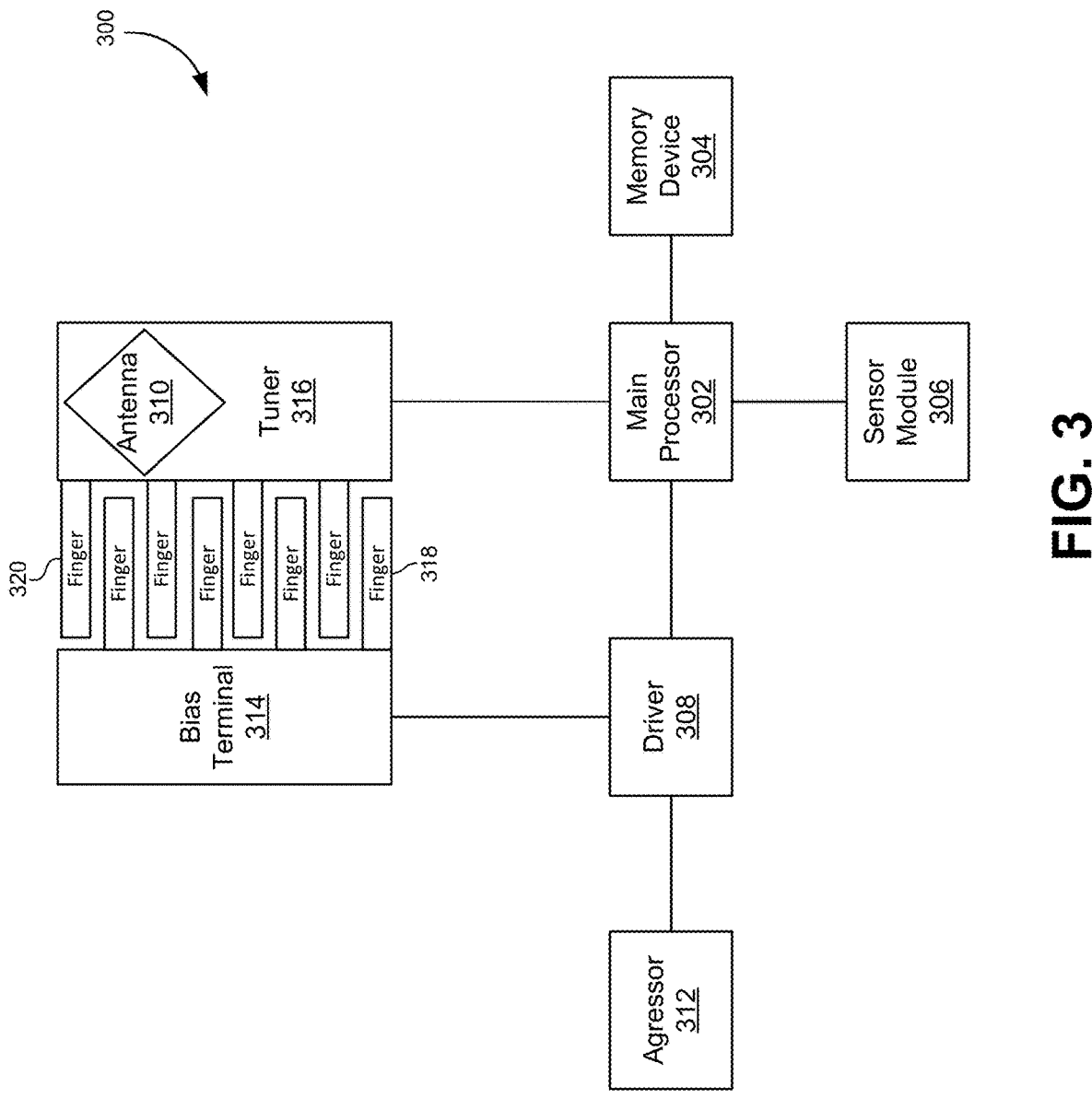
FIG. 3 illustrates a simplified electronic device with a microelectromechanical-(MEMS) actuated tuner, according to an embodiment.

FIG. 3 illustrates a simplified electronic device with a microelectromechanical-(MEMS)-actuated tuner, according to an embodiment. In some embodiments, the electronic device 300 may be similar to the electronic device 200 of FIG. 2. A main processor 302, a memory unit 304, a sensor module 306, a driver 308, an antenna 310, and an aggressor 312, shown in FIG. 3 may be analogous to the corresponding components in FIG. 2, in both connections and operability. The electrostatic MEMS-actuated tuner may include a tuner 316, tuner fingers 320, a bias terminal 314, and/or terminal fingers 318. The bias terminal 314 may be connected to the driver 308. The antenna 310 is shown mounted on the tuner 316, which may be operable to physically move the antenna 310. One of ordinary skill in the art with the benefit of this disclosure would recognize many configurations that would enable a MEMS-actuated tuner to adjust the properties of the antenna 310 without physically moving the antenna 310.

In some embodiments, sensor module 306 may measure a characteristic associated with the antenna 310. The measured characteristic may be an SNR, a bit error rate check with an associated success rate, EM field strengths at one or more frequencies, a shape of a radiative pattern or other characteristic associated with the antenna 310. The main processor 302 may then access a data structure stored on memory device 306 and determine that the measured characteristic violates an associated predetermined threshold. The main processor 302 may access data associated with a stimulus based on a first configuration of the antenna 310 and/or the second configuration of the aggressor 312.

The main processor 302 may determine that a stimulus delivered to the MEMS tuner 316 will cause a third configuration such that the measured characteristic will no longer violate the predetermined threshold. In some embodiments, the main processor 302 may access pre-populated data from the data table including a stimulus and associated magnitude to apply to a component on the electronic device 300. In other embodiments, the main processor 302 may calculate the magnitude of a stimulus necessary to achieve the third configuration.

The main processor 302 may send instructions to the driver 308 based on the data associated with the stimulus accessed from the memory device 304. The driver 308 may then apply a voltage to the bias terminal 314. The voltage may cause an electrostatic charge to accumulate on the terminal fingers 318. In response to the electrostatic charge, the tuner fingers 320 may experience a coulomb force and deflect the tuner 316. The antenna 310 may be deflected as well. The deflection may cause a third configuration for the antenna 310, such that the measured characteristic no longer violates the predetermined threshold. In this example, this may include an improved SNR, a bit error rate check with a higher associated success rate, reduced EM field strengths at one or more frequencies characterized by a reduction in interference, a change in shape of a radiative pattern which reduces interference or other characteristic associated with the antenna 310.

Although FIG. 3 shows an electrostatic MEMS-actuated tuner, some embodiments may utilize other MEMS-actuated tuners. An electrothermal MEMS-actuated tuner may include a material stack characterized by materials with varying coefficients of thermal expansion (CTE). The material stack may include Al2O3, Si, SiN, and Au. Current may be passed through one or more of the materials in the material stack, which may be deformed due to the differences in CTE of the varying layers. The stack may be configured such that the deformation exerts pressure on the antenna 310, causing a third configuration of the antenna 310. The third configuration may result in the measured characteristic no longer violating the predetermined threshold. In this example, the third configuration may be characterized by a shift in a direction of a signal emitted by the antenna which causes the SNR to no longer violate the predetermined threshold.

Piezoelectric (PE) MEMS-actuated tuners may be used, including a piezoelectric material and electrodes. A PE material may include LiNbO3, AlN, ZnO, PZT, and other materials with piezoelectric properties. A current applied to the electrodes may cause the piezoelectric material to deform. The PE material may be configured such that when the PE material deforms, pressure is exerted on the antenna 310, causing a third configuration of the antenna 310. The third configuration may result in the measured characteristic no longer violating the predetermined threshold. In this example, this may include an improved SNR, a bit error rate check with a higher associated success rate, reduced EM field strengths at one or more frequencies characterized by a reduction in interference, a change in shape of a radiative pattern which reduces interference or other characteristic associated with the antenna 310.

A MEMS-actuated tuner (which may include electrostatic, electrothermal, and/or PE MEMS-actuated tuners) may be used to alter properties of an antenna fabricated from meta-materials. A meta-material may be characterized by a change in electromagnetic properties in response to a certain stimuli. Meta-materials may include liquid crystal, graphene, ferroelectric materials such as LiNbO3 and BST, chalcogenide, VO2, and semiconductor materials.

By configuring a MEMS-actuated tuner to deform or put pressure on an antenna fabricated from a meta-material, different tuning types may be achieved. In some embodiments, the MEMS-actuated tuner may be an impedance tuner, improving S11 values (measured as return loss and/or impedance) of the antenna by changing its physical properties. In some embodiments, the tuner may include an aperture tuner, modifying the electrical length of an antenna to shift the resonance of the operating frequencies of the antenna. The S11 and/or the electrical length of the antenna may be adjusted by the MEMS actuated tuner such that a measured characteristic no longer violates a predetermined threshold. This may include an improved SNR, a bit error rate check with a higher associated success rate, reduced EM field strengths at one or more frequencies characterized by a reduction in interference, a change in shape of a radiative pattern which reduces interference or other characteristic associated with the antenna 310.

Figure 4:
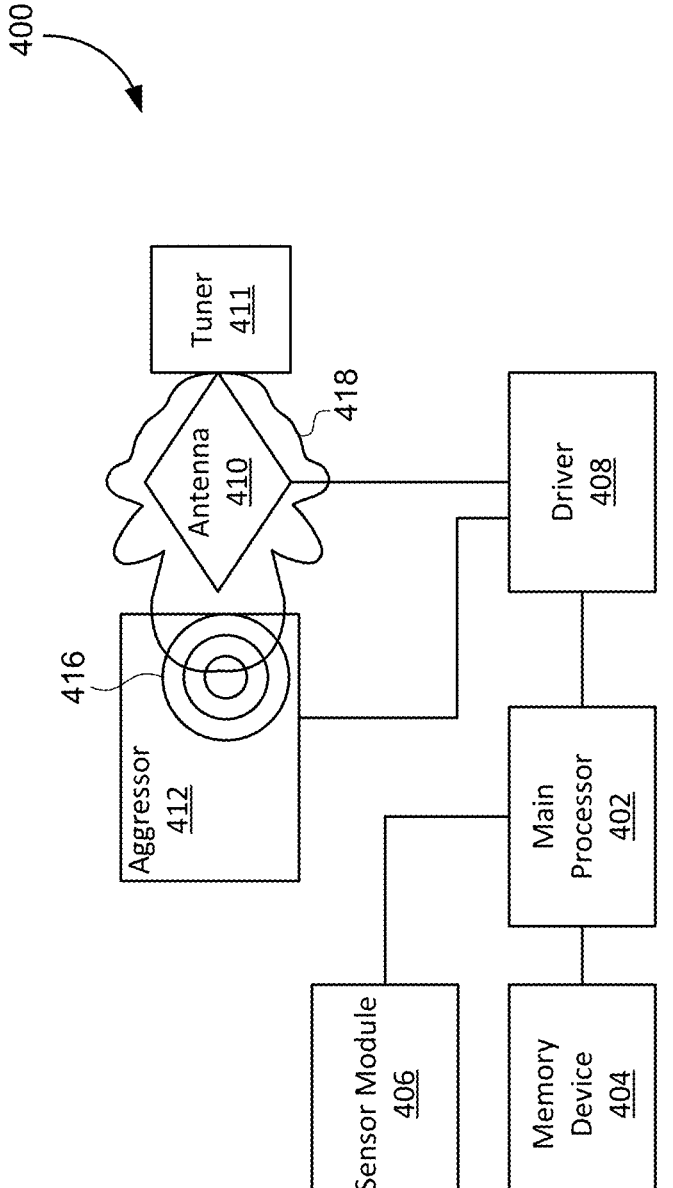
FIG. 4 illustrates an electronic device wherein an aggressor is emitting an electromagnetic EM field which causes interference with an operation of an antenna, according to some embodiments.

FIG. 4 illustrates an electronic device 400 where an aggressor is emitting an EM field that causes interference with the operation of an antenna, according to some embodiments. In some embodiments, the electronic device 400 may be similar to electronic device 200 in FIG. 2. The electronic device 400 may include a main processor 402, a memory device 404, a sensor module 406, a driver 408, an antenna 410, a tuner 411 and/or an aggressor 412 as shown in FIG. 4, which may be analogous to the corresponding components in FIG. 2, in both connections and operability.

The antenna 410 may be fabricated from a meta-material. A meta-material may include liquid crystal, graphene, ferroelectric materials such as LiNbO3 and BST, chalcogenide, VO2, and semiconductor materials. In some embodiments, the antenna 410 may also include a MEMS-actuated tuner as described above, operable to alter EM properties of antenna 410 by delivering stimuli to the meta-material.

In some embodiments, the aggressor 412 may be a component of the electronic device 400. The aggressor may emit EM field 416 due to normal operation of a component of electronic device 400. In other embodiments, the aggressor 412 may be a λ/4 point of the antenna 410 or of another aggressor (not shown). The EM field may be caused by a resonant frequency of EM radiation emitted by antenna 410 or by another aggressor (not shown).

Antenna 410 may have an associated radiative pattern 418, characterized by lobes of higher and lower intensity. The radiative pattern 418 may be associated with an operation of the antenna 410. In some embodiments, the operation may be a receiving operation. The operation may also be a transmitting operation, with the radiative pattern 418 being associated with a direction of a signal emitted by the antenna 410. In some embodiments, the EM field 416 may overlap with the radiative pattern 418, causing interference with the radiative pattern 418. The interference may interrupt or disrupt an operation of antenna 410, violating a predetermined threshold.

The sensor module 406 may measure a characteristic associated with the antenna 410. The measured characteristic may be a signal-to-noise ratio (SNR), bit error rate check with an associated success rate, EM field strengths at one or more frequencies, a shape of a radiation pattern or other characteristic associated with the antenna 410. The main processor 302 may access data associated with a stimulus based on a first configuration of the antenna 410 and/or the second configuration of the aggressor 412.

The main processor 402 may determine that a stimulus delivered to antenna 410 would cause the measured characteristic to no longer violate a predetermined threshold. In determining a third configuration of the antenna 410, the main processor may utilize the data accessed from the data structure on the memory device 404 to determine one or more stimuli based on the first and/or second configurations. In some embodiments, the main processor may access pre-populated data from the data table including a stimulus and associated magnitude to apply to a component on the electronic device 400. In other embodiments, the main processor 402 may calculate the magnitude of a stimulus necessary to achieve the third configuration.

FIG. 5 illustrates an electronic device wherein an aggressor is emitting an electromagnetic EM field which no longer interferes with a radiative pattern of an antenna, according to some embodiments. The electronic device 500 may be the same device as the electronic device 400 in FIG. 4, where the antenna 410 is now in a third configuration. The components on electronic device 500 therefore may correspond to the components of the electronic device 400 in FIG. 4. Antenna nulling and radiation pattern nulling of the aggressor may be dynamically and intelligently changed by changing the properties of the aggressor shielding and antenna meta-materials to optimally tune the nulls in either or both of the radiation patterns to minimize noise coupling to address security, EMI or noise, or "desense" performance of the antennas. Radiation plots of most antennas exhibit a pattern of maximums referred to as "lobes" at various angles, which are separated by "nulls" where the radiation pattern decreases to zero. Antenna pattern nulling may be dynamically used by some embodiments to suppress interference in the beam pattern by placing nulls in the directions of the interfering sources. In radio electronics, a null is a direction in an antenna's radiation pattern where the antenna radiates almost no radio waves, so the far field signal strength is a local minimum. FIG. 5 illustrates how these nulls and lobes may be dynamically moved to minimize interference.

The main processor 402 may have determined that a stimulus delivered to the antenna 410 would cause a measured characteristic to no longer violate a predetermined threshold, such as the characteristics listed above, associated with the antenna 410 in FIG. 4. Returning to FIG. 5, the main processor 502 may send instructions to the driver 508, including a stimulus based on the first configuration of antenna 410 and/or the second configuration of the aggressor 412, to apply to the antenna 510. In some embodiments, the stimulus may be delivered to the antenna 510 itself. In some embodiments, a stimulus may be provided to a tuner 511, such as a MEMS-actuated tuner described above.

In response to the stimulus, one or more properties of the antenna 510 may cause a third configuration, characterized by a shift in the radiative pattern 518. The radiative pattern 518 may be associated with an operation of the antenna 510. In some embodiments, the operation may be a receiving operation. The operation may also be a transmitting operation, with the radiative pattern 518 being associated with a direction of a signal emitted by the antenna 510. The shift in the radiative pattern 518 may cause a the radiative pattern 518 to no longer overlap with EM field 516, mitigating the interference to a level that no longer violates a predetermined threshold. In some embodiments, the shift in radiative pattern 518 results in a shift in a direction of a signal emitted by the antenna 510. The shift in the direction of the signal emitted by the antenna may cause the measured characteristic, such as an SNR, to no longer violate the predetermined threshold.

Figure 6:
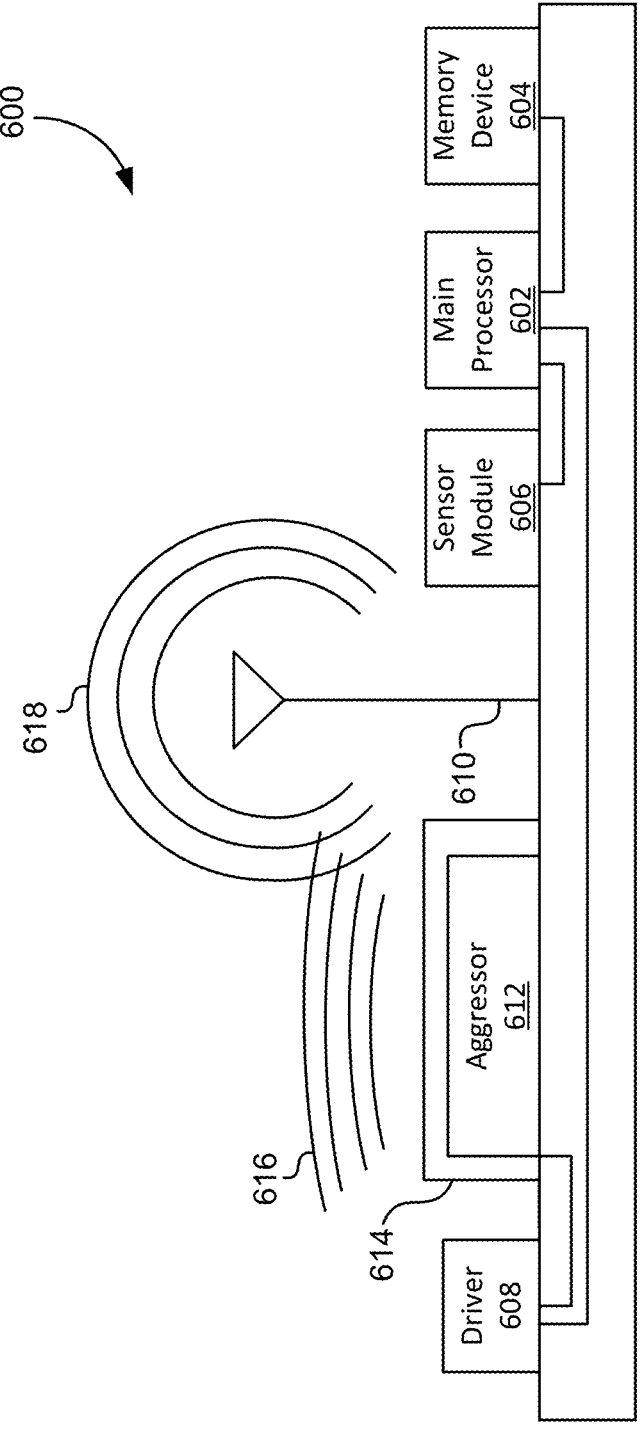
FIG. 6 illustrates a simplified electronic device experiencing noise from an aggressor, according to some embodiments.

FIG. 6 illustrates a simplified electronic device experiencing noise from an aggressor, according to some embodiments. The electronic device 600 may be a side view of the electronic device 200. The electronic device 600 may include a main processor 602, a memory device 604, a sensor module 606, a driver 608, an antenna 610, and/or an aggressor 612 shown in FIG. 4, which may be analogous to the corresponding components in FIG. 2 in both connections and operability. Additionally, the electronic device 600 may include an aggressor shielding material 614. The aggressor 612 is shown emitting noise 616, which may be interfering with a signal 618, emitted from the antenna 610.

In some embodiments, the aggressor 612 may be a component on the electronic device 600, such as an unintentional antenna, a $\lambda/4$ resonant point, or other emitter of unwanted EM radiation. The aggressor shielding material 614 may have been deposited as part of the design phase, described above. The aggressor shielding material may include a "smart" material. Smart materials may include shape-memory alloys (SMAs), whose properties may be changed by the application of pressure. Examples of SMAs include Nitinol, NiTi, and Cu–Al+Ni alloys including Zn, Cu, Au, and Fe. Smart materials may also include piezoelectric materials, characterized by associated coefficients of thermal expansion (CTE), Young's modulus, and other deformation and radiative characteristics. Smart materials may also include magnetic shape memory alloys (MSMA) which change their physical shape in response to a change in a surrounding magnetic field. Examples of MSMAs include NiMnGa+Cu, Co, or Fe. Smart materials may further include smart inorganic polymers including polysiloxanes, poly-protDOT-Me2, polystannanes, and polyferrocenylsilane. The aggressor shielding material may therefore be characterized by an ability to change in shape and/or one or more EM properties in response to a stimulus.

The sensor module 606 may measure a characteristic associated with the antenna 610. The measured characteristic may include characteristics described above, such as those described in FIG. 2. The main processor 602 may access data from the memory device 604, the data being associated with a stimulus based on a first configuration of the antenna 610 and/or the second configuration of the aggressor 612. The main processor 602 may determine that a stimulus delivered to the aggressor shielding material 614 would cause a third configuration, such that the measured characteristic to no longer violates a predetermined threshold. This may include an improved SNR, a bit error rate check with a higher associated success rate, reduced EM field strengths at one or more frequencies characterized by a reduction in interference, a change in shape of a radiative pattern which reduces interference or other characteristic associated with the antenna 310.

The materials described herein may adjust their properties dynamically in response to an input stimulus. For example, SMAs are materials that "remember" their original shape and which can return back to this original shape after deformation when the stimulus is removed. For example, at a low temperature, an SMA can be seemingly plastically deformed, but this plastic strain can be recovered by increasing the temperature of the material. Some SMAs can return to a shape that is different from their original shape under a stimulus, thus holding two different shapes. These SMAs are referred to as two-way SMAs. SMAs may also show a property referred to as "super plasticity" when they exhibit a rubber-like behavior. SMAs may produce a large deformation compared to most other metals. They may also be very elastic and recover from relatively large strains of about 7% with a small amount of hysteresis present due to a reversible change in their crystal structure. Specifically, SMAs have two different phases with different crystal structures and properties: a high temperature phase referred to as martensite, and a low temperature phase referred to as austenite. Contrary to a typical transformation that involves the diffusion of atoms, the phase change in SMAs occurs by a shear lattice distortion, which makes the change reversible.

In other examples, meta-materials such as liquid crystals, graphene, phase change materials, ferroelectric materials and semiconductor materials may be used by various embodiments. Ferro-magnetic materials (such as Lithium Niobate and Barium Strontium Titanate (BST)) can tune a negative refractive index thermally and electrically as a result of their asymmetric crystalline structures. Phase change materials, such as chalcogenide may transition between a crystal state and an amorphous state in response to heating and/or cooling the material, and both states are nonvolatile with zero holding power. Vanadium dioxide ($VO_2$) may transition between metal and insulator state in response to a heating stimulus. Semiconductor materials, including substrate and/or meta-materials, can photo-excite extra carriers by a laser stimulus and thus tune the electrical properties of their resonance.

Meta-materials may include geometric structures of the unit cell that dictate the effective properties. An efficient tuning method for the antennas is to reconfigure these unit cells using MEMS actuators. The in-plane and out-of-plane displacement and rotation may be introduced by a number of different actuator techniques, including electrostatic actuation, electrothermal actuation, piezoelectric actuation, and/or electromagnetic actuation.

Some embodiments may use an electrostatic actuator that includes two closely placed electrodes, one stationary and the other moveable. When a voltage stimulus is applied, the Coulomb force actuates the moveable electrodes towards the stationary one and is balanced by the restoring forces from a supporting spring to determine a final displacement. Some embodiments may also use the pull-in ("snap-down") effect, which refers to a sudden physical contact between the two electrodes when the moveable electrode travels a certain distance of the capacitive gap. This pull-in effect can be leveraged as an on-off switch in meta-materials.

Some embodiments may use an electrothermal actuator that includes a pair of stacked materials with different thermal expansion coefficients, including aluminum oxide ($Al_2O_3$), Si, silicon nitride (SiN), gold (Au), and other materials. These actuators exhibit a large actuation force, slow response, and relatively high power consumption. Although in-plane displacements can also be realized by the U-shape thermal actuators, most of the electrothermal actuators in meta-materials are shaped as cantilevers or rings that leverage residue stress to allow out-of-plane movements. Embodiments using these actuators may apply a temperature stimulus to adjust the antenna.

Some embodiments may use piezoelectric actuators and/or electromagnetic actuators. In the piezoelectric actuator, a stimulus in the form of an applied DC voltage across the electrodes of a piezoelectric material, such as lithium niobate (LiNbO3), aluminum nitride (AlN), zinc oxide (ZnO) and/or lead zirconate titanate (PZT), results in a net strain that is proportional to the magnitude of the electric field and leads to the displacement. Microfluidics technology also provides a practical method to guide the liquid metal as the unit cell. An applied stimulus to the pneumatic valve can vary the shape of each unit cell to tailor the response of the incident EM wave until the EM interference is reduced below the threshold.

Some embodiments may apply a stimulus to a MEMS-actuated meta-material. MEMS-actuated meta-materials may modulate EM waves homogeneously across the meta-materials. The unit cells at different reconfiguration states may tune the amplitude frequency and/or bandwidth. The transmission may be modulated by the stimulus of external temperature. For example, an array of Split Ring Resonators (SRRs) may be attached to a freestanding substrate, which may be supported by bimorph cantilevers of, for example, Au and SiN. The SRRs may be in-plane at the initial state and bend upwards upon the increase of ambient temperature as a result of the mismatch between the TEC of Au and SiN. When the magnetic field of incident EM waves is parallel to the gap in SRRs, magnetic dipoles may be driven to affect the EM radiation. The resonance strength is increased when the SRRs bend up and a larger area is pierced by the magnetic field, which results in a decrease in the EM transmission. When the electric field is parallel to the gap in SRRs, the upwards movement decreases the projection of the electric field and the circulating currents, which results in an increase in the EM transmission.

In determining a third configuration, the main processor may utilize the data accessed from the data structure on the memory device 604 to determine one or more stimuli based on the first and/or second configurations. In some embodiments, the main processor may access pre-populated data from the data table including a stimulus and associated magnitude to apply to a component on the electronic device 600. In other embodiments, the main processor 602 may calculate the magnitude of a stimulus necessary to achieve the third configuration.

Figure 7:
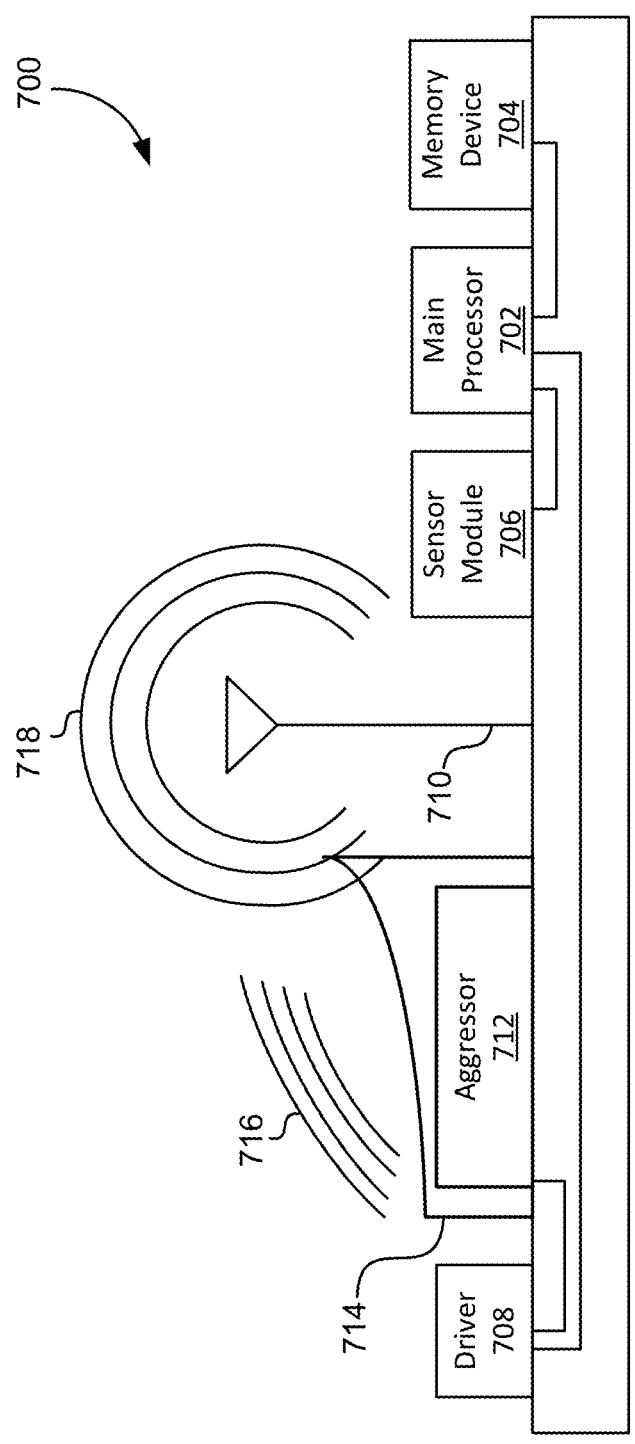
FIG. 7 illustrates a simplified electronic device where noise from an aggressor has been mitigated due to a stimulus delivered to an aggressor shielding material, according to some embodiments.

FIG. 7 illustrates a simplified electronic device where noise from an aggressor has been mitigated due to a stimulus delivered to an aggressor shielding material, according to an embodiment. The electronic device 700 may be the same as the electronic device 600, wherein the aggressor shielding material 714 is now in a third configuration. The components on the electronic device 700 may correspond to the components of the electronic device 600 in FIG. 6.

The main processor 602 may have determined that a stimulus delivered to the aggressor shielding material 614 would cause a measured characteristic to no longer violate a predetermined threshold such as those listed above, associated with electronic device 600. Returning to FIG. 7, the main processor 702 may then send instructions, including a stimulus based on a first configuration of antenna 710 and/or a second configuration of aggressor 712 (which may include information associated with aggressor shielding material 714), to apply to the aggressor shielding material 714.

In some embodiments, the aggressor shielding material 714 may deform in response to the application of a stimulus. The deformation may result in a change of shape and/or one or more EM properties of the aggressor shielding material 714. In some embodiments, the aggressor shielding material 714 may change EM properties in response to a stimulus without deforming. In this example, the change in shape and/or one or more EM properties of the aggressor shielding material may result in the noise 716 being attenuated, a success rate of a bit error rate check no longer violating the predetermined threshold. The change may also result in the noise being redirected such that the EM radiation 716 no longer interferes with the signal 718. Note that the physical change to the aggressor shielding material 714 is exaggerated in size to clearly identify the effect. Actual changes to the aggressor shielding material 714 may be much less pronounced and/or non-physical in nature.

FIG. 8 illustrates a flowchart of a method for mitigating electromagnetic (EM) radiation on an electronic device, according to an embodiment. The method 800 may include determining that a measured characteristic associated with an antenna violates a predetermined threshold, where the antenna is in a first configuration (802). In some embodiments, the measured characteristic may be a shape of a radiative pattern, EM field strengths at various frequencies, spurious EM signals, a signal-to-noise ratio (SNR), bit-error rate check, or other characteristic of the antenna.

In some embodiments, the first configuration may include formation about a location of the antenna and the fabrication of the antenna. The antenna may be fabricated from a meta-material, characterized by a change in shape and/or one or more EM properties in response to a stimuli. A meta-material may include liquid crystal, graphene, ferroelectric materials such as LiNbO3 and BST, chalcogenide, VO2, and semiconductor materials. One or more meta-materials may be used to fabricate the antenna.

In some embodiments, the first configuration may include a first location on the electronic device of the antenna and a tuner. The tuner may also include a microelectromechanical (MEMS)-actuated tuner, operable to alter EM properties of antenna by delivering stimuli to the meta-material. A MEMS-actuated tuner may include an electrostatic actuator such as the one described in FIG. 3, electrothermal actuator, and piezoelectric tuner. The tuner may also include an impedance tuner including a screw tuner or stub tuner, improving S11 values (measured as return loss and/or impedance) of the antenna by changing its physical properties. The tuner may also include circuitry configured to operate as an aperture tuner.

The method 800 may also include identifying an aggressor, where the aggressor is a component on the electronic device that emits EM radiation (804). The EM radiation may cause the measured characteristic to violate the predetermined threshold associated with the antenna. The aggressor may be in a second configuration.

In some embodiments, the aggressor may be a component on the electronic device, an unintentional antenna, a λ/4 resonant point, or other emitter of unwanted EM radiation. The second configuration may include a second location on the electronic device of the aggressor and an aggressor shielding material, deposited on the aggressor. In some embodiments, the aggressor shielding material may be a "smart" material characterized by a change in shape and/or one or more EM properties in response to a stimulus. Smart materials may include shape-memory alloys (SMAs), whose properties may be changed by the application of pressure. Examples of SMAs include Nitinol, NiTi, and Cu—Al+Ni alloys including Zn, Cu, Au, and Fe. Smart materials may also include piezoelectric materials, characterized by associated coefficients of thermal expansion (CTE), Young's modulus, and other deformation and radiative characteristics. Smart materials may also include magnetic shape memory alloys (MSMA) which change their physical shape in response to a change in a surrounding magnetic field.

Examples of MSMAs include NiMnGa+Cu, Co, or Fe. Smart materials may further include smart inorganic polymers including polysiloxanes, poly-protDOT-Me2, polystannanes, and polyferrocenylsilane. In some embodiments, the aggressor shielding material may be deposited in two dimensions. The aggressor shielding material may also be deposited in three dimensions. A data structure may include data associated with the measured characteristic, the first configuration, and the second configuration.

The method 800 may include determining one or more stimuli to apply to the antenna and/or the aggressor that causes the measured characteristic associated with the antenna to no longer violate the predetermined threshold (806). In some embodiments, a memory device includes a non-volatile memory device. Determining the one or more stimuli may include accessing information stored in the data structure. This information may also include predetermined thresholds for each of the plurality of characteristics, information associated the one or more configurations, and one or more stimuli correlated to one or more configurations.

The method 800 may include applying the one or more stimuli to the antenna and/or the aggressor to cause the measured characteristic to no longer violate the predetermined threshold (808). In some embodiments, the one or more stimuli may be applied to the antenna only.

In some embodiments, the measured characteristic may include a signal-to-noise ratio (SNR). The one or more stimuli may be applied to one or more components of the electronic device, causing a third configuration. The third configuration may be characterized by a shift in a direction of a signal emitted by the antenna. The shift in direction may cause the SNR to no longer violate the predetermined threshold.

In some embodiments, such as the one described in FIGS. 6 and 7, the measured characteristic may include a bit error rate check, with a first success rate that violates a predetermined threshold due to an EM noise emitted by the aggressor. The one or more stimuli may be applied to one or more components of the electronic device causing a third configuration. The third configuration may be characterized by a reduction in the EM noise emitted from the aggressor. The reduction in EM noise may cause a second success rate of the bit error rate check that does not violate the predetermined threshold.

In some embodiments, such as the one described in FIGS. 3 and 4, the measured characteristic may include an EM field which causes interference with a radiative pattern associated with an operation of the antenna. The one or more stimuli may be applied to one or more components of the electronic device, causing a third configuration. The third configuration may be characterized by a shift in the radiative pattern associated with the operation of the antenna. The shift in radiative pattern may mitigate the interference to no longer violate the predetermined threshold.

It should be appreciated that the specific steps illustrated in FIG. 8 provide particular methods of mitigating undesired effects of EM radiation according to various embodiments. Other sequences of steps may also be performed according to alternative embodiments. For example, alternative embodiments may perform the steps outlined above in a different order. Moreover, the individual steps illustrated in FIG. 8 may include multiple sub-steps that may be performed in various sequences as appropriate to the individual step. Furthermore, additional steps may be added or removed depending on the particular applications. Many variations, modifications, and alternatives also fall within the scope of this disclosure.

FIGS. 9-15 illustrate a series of examples for mitigating noise from an aggressor component against a victim component. The source or aggressor component may include any component, such as a system-on-a-chip (SoC), a DDR SRAM, a GPU, a CPU, a processing core, a cryptographic processor, or any other digital component with the capability to produce electromagnetic noise. Additionally, the aggressor may include any associated communications between these devices, including communication through traces, through substrate layers, through packaging layers, through PCB buildup layers, or any other communication routing. Any of these types of aggressors may generate noise during operation, and if that noise leaks and is coupled to a victim component, such as an antenna or other radio component, this aggressor noise may interfere with the operation of the victim component as described above.

The embodiments described herein leverage aspects of material science and physics to reduce the noise interference from the aggressor by adjusting operating configurations on the victim and/or aggressor circuits. For example, smart materials may be used with the aggressor circuit and in shielding materials between the victim and the aggressor. Smart materials may also be used to shield radio components in the victim circuit. These materials may be tuned using open-loop "single" adjustments, as well as repeated closed-loop, real-time adjustments. The materials may be tuned so as to decouple the noise as much as possible. Meta-materials and shielding materials may be used on the aggressor side and/or the victim side, and these materials may be used to tune the circuits, or possibly radiate the noise in a different direction that does not interfere with the victim circuit. For example, impedance tuners, aperture tuners, antenna tuners, and other circuits may be used to control the meta-materials and other physical aspects of the circuits to reduce interference. Physical aspects may include permeability, permittivity, conductivity, and the radiation structure of the meta-materials and shielding materials.

Figure 9:
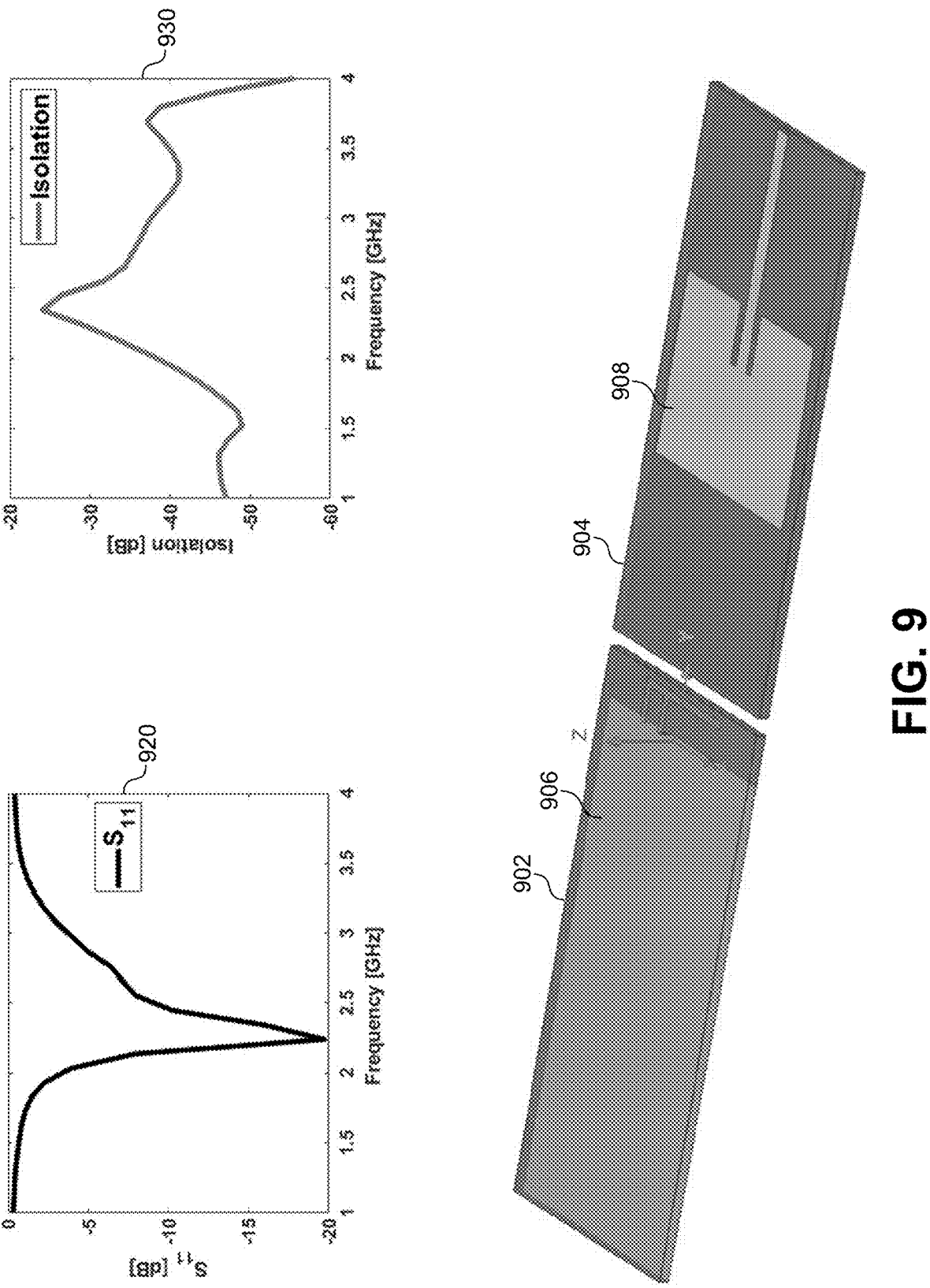
FIG. 9 illustrates a baseline configuration for both the victim and the aggressor, according to some embodiments.

FIG. 9 illustrates a baseline configuration for both the victim and the aggressor, according to some embodiments. As a baseline configuration, it may be assumed that some noise from the aggressor 908 is coupled to the victim 906 creating communication problems, security problems, and so forth. As described above, traces on a printed circuit board may act as an unintentional antenna. For example, traces between the CPU and a DDR3 memory may constitute an aggressor by acting as an unintentional antenna to radiate noise. Alternatively, intentional antennas may also act as an aggressor by purposefully emitting electronic signals that are not properly shielded that are unintentionally coupled to the victim circuit. This may be particularly true when the emitted harmonics interfere with the operational frequency of the victim antenna. In this example, the aggressor 908 may include an unintentional patch antenna representing the radiation a pattern of a DDR3 communication with a SoC. The DDR3 communication may operate at a frequency that produces an interfering resonant frequency for the antenna (e.g. 800 MHz, the third harmonic of which falls at approximately 2.4 GHz). The victim 906 may include a Planar Inverted-F Antenna (PIFA) operating at approximately 2.4 GHz mounted on a printed circuit board (PCB) 902. The aggressor 908 may be mounted on a separate PCB 904 that is physically separated from the PCB 902 by at least 3 mm in these examples. As a baseline configuration, this example need not use any meta-materials or shielding materials between the victim 906 and the aggressor 908.

Graph 920 illustrates the return loss for the PIFA antenna of the victim 906, illustrating that the PIFA antenna is tuned to the 2.4 GHz frequency. Graph 930 illustrates the isolation between the victim 906 and the aggressor 908. As shown, there may be approximately 25 dB of isolation between the victim 906 and the aggressor 908 at the 2.4 GHz frequency. Note that the isolation is also a function of the distance between the victim 906 and the aggressor 908. For each of these examples, it may be assumed that the distance between the PCB 902 and the PCB 904 is approximately 3 mm.

The following examples illustrate the coupling between the magnetic/electric fields generated by the aggressor 908 that are coupled to the victim 906. These examples show how the meta-materials and dielectric constants can be included and tuned on the victim 906 and/or the aggressor 908, and how different shielding materials can disrupt the coupling of these magnetic/electric fields between the victim 906 and the aggressor 908.

FIG. 10 illustrates a configuration using a meta-material 1002 with the victim 906, according to some embodiments. The structure of the meta-material 1002 may have a dielectric constant that can be varied, for example, between about 2.1 and about 10.0. The structure of the meta-material 1002 may be placed over the traces for the victim 906 as illustrated in FIG. 10. As described above, the meta-material 1002 may include a crystalline structure. Additionally, the structure may be varied in order to effectuate a "coarse" control of the characteristics of the meta-material 1002 in addition to the normal "fine" tunability of the material itself in the meta-material 1002.

Graph 1020 illustrates the return loss for the victim 906. The return loss $S_{11}$ represents the amount of the reflected signal for impedance mismatch for the PIFA antenna. This return loss may be tuned by adjusting the permeability $\varepsilon_r$ of the meta-material 1010. For example, the different curves in the graph 1020 illustrate the return loss $S_{11}$ for a meta-material 1002 having a permeability tuned to $\varepsilon_r$=2.1, 4.4, 6.0, and 10.0. Similarly, graph 1030 illustrates how the isolation between the victim 906 and the aggressor 908 also changes with the permeability of the meta-material 1002. The change in the dielectric constant is reflected in the shifting of the operation frequency of the PIFA antenna, and the isolation may be improved between the two antennas depending on the DR values of the meta-material 1002.

Generally, increasing the isolation between the victim 906 and the aggressor 908 will correspond to better return loss for the victim at the operating frequency, and a reduced coupling between the victim 906 on the aggressor 908. Specifically, the permeability may be adjusted to have a better return loss on the intentional antenna of the victim 906, along with a worse return loss on the unintentional antenna of the aggressor 908 (i.e., as much energy as possible should be reflected back to the aggressor 908 rather than being coupled with the victim 906). Therefore, meta-materials used on the side of the victim 906 may be tuned differently from the meta-materials used on the side of the aggressor 908.

Figure 11:
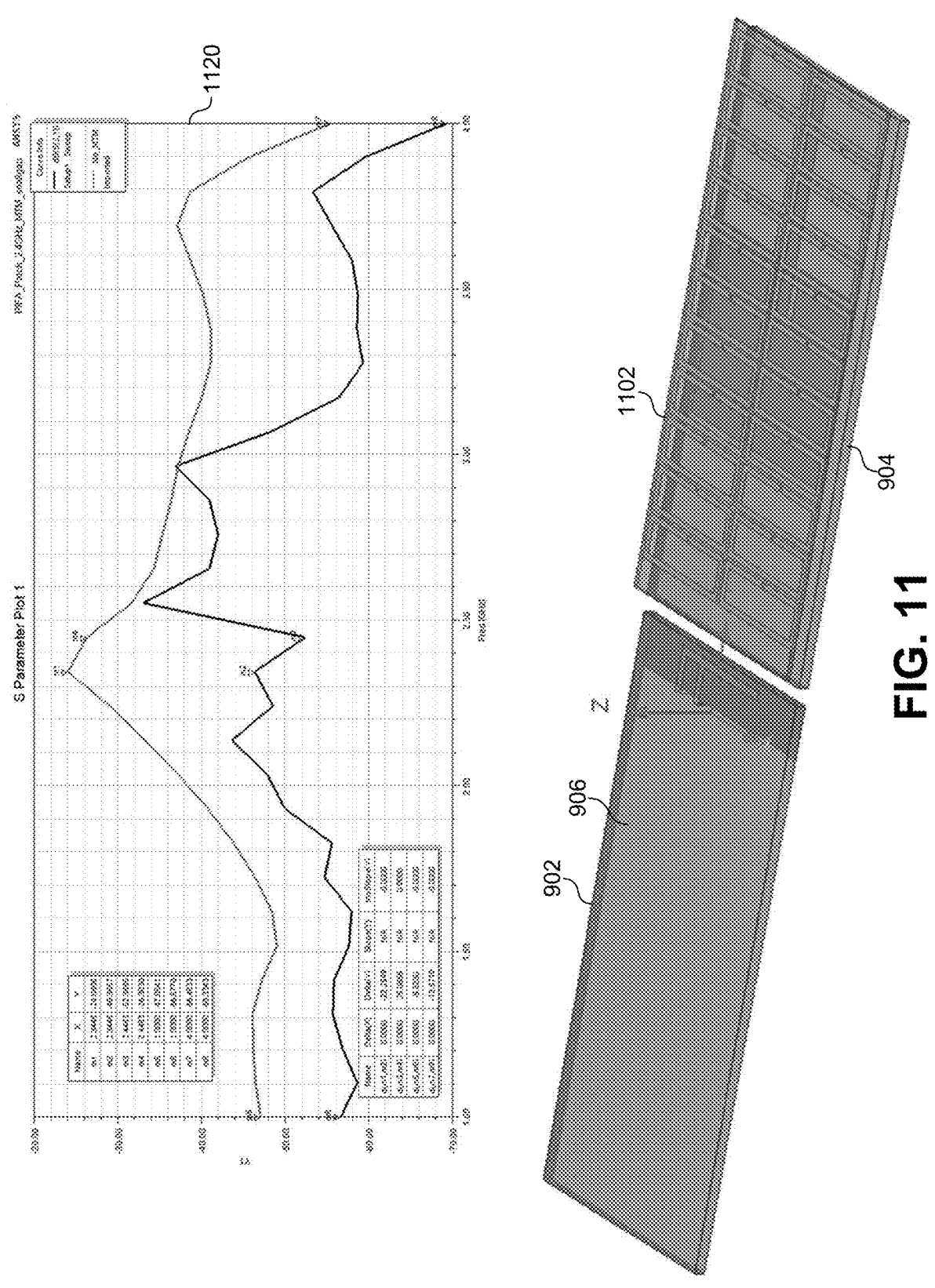
FIG. 11 illustrates a meta-material structure used on the aggressor, according to some embodiments.

FIG. 11 illustrates a meta-material structure used on the aggressor 908, according to some embodiments. In this example, a meta-material array 1102 may overlay the PCB 904 of the aggressor 908. The meta-material array 1102 may include repeated patterns of the meta-material. The meta-material array 1102 allows the communication link between the DDR3 and the SoC to continue to conduct, but will alter the antenna characteristic of the unintentional antenna. Any type of meta-material arrangement may be used in the array as a repeated pattern in an array.

Graph 1120 illustrates the isolation that may be achieved with and without the meta-material array 1102 for comparison. At the 2.4 GHz frequency, the meta-material array shows approximately a 20 dB improvement in isolation between the victim 906 and the aggressor 908. Additionally, over the operating range of 1.0 GHz to 4.0 GHz, the improvements in isolation varies from about 10 dB to about 26 dB.

Figure 12:
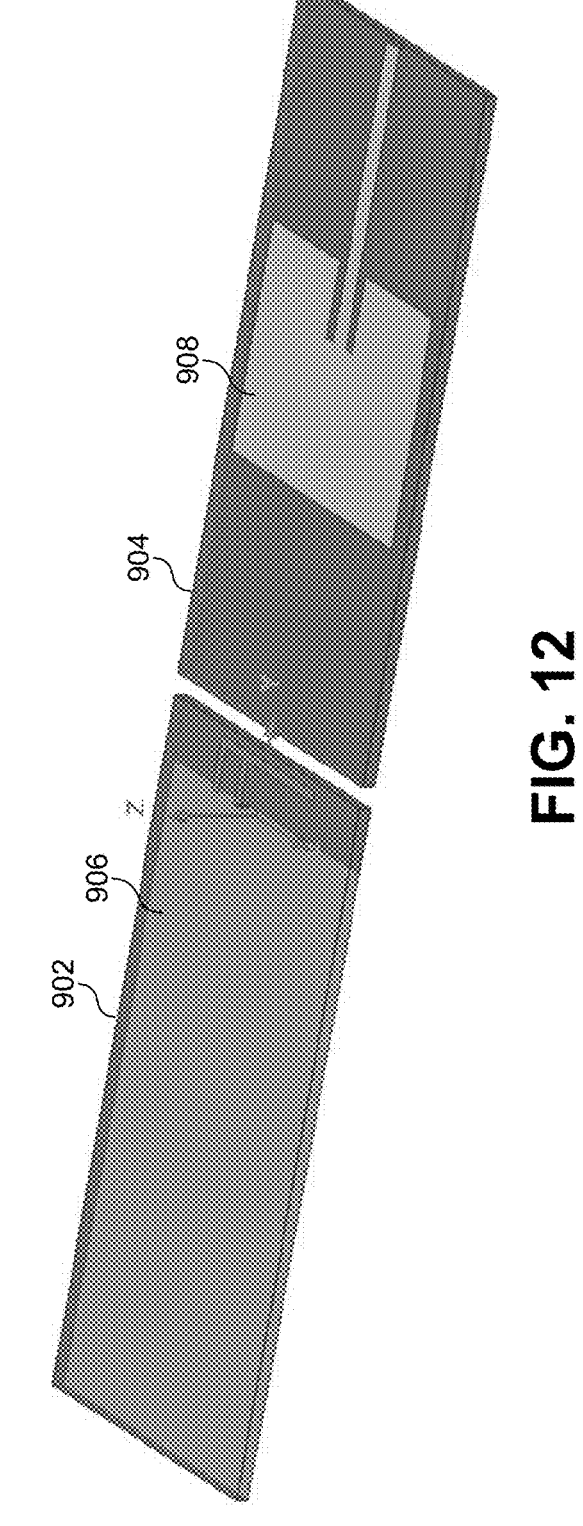
FIG. 12 illustrates how changing the dielectric constant of the aggressor may be used to improve isolation between the victim and the aggressor.

FIG. 12 illustrates how changing the dielectric constant of the aggressor 908 may be used to improve isolation between the victim 906 and the aggressor 908. The dielectric constant or permittivity of the dielectric material used for the substrate of the PCB 904 can be altered or tuned as part of the design to adjust the dielectric constant. In this example, the dielectric constant may be adjusted between about 2.1 and about 10.0. Graph 1220 illustrates how the isolation may be tuned by adjusting the dielectric constant of the PCB 904. Generally, higher dielectric constants will make the unintentional antenna of the aggressor 908 lossier.

Figure 13:
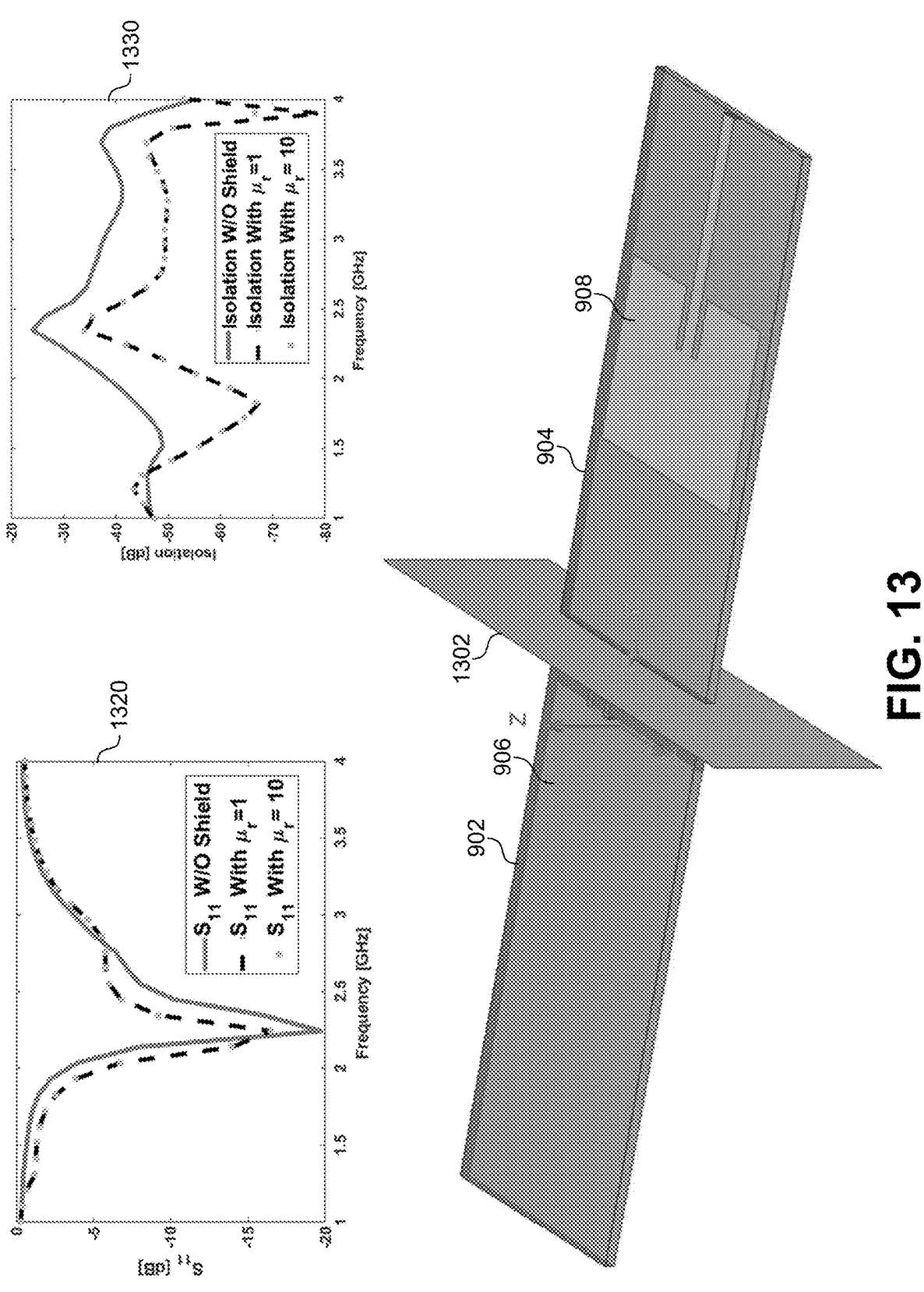
FIG. 13 illustrates a shielding material disposed between the PCB of the victim and the PCB of the aggressor, according to some embodiments.

FIG. 13 illustrates a shielding material 1302 disposed between the PCB 902 of the victim 906 and the PCB 904 of the aggressor 908, according to some embodiments. When using a shielding material 1302, the design allows two different parameters to be independently tuned to adjust the isolation between the victim 906 and the aggressor 908: the magnetic properties $\mu_r$ and the electrical conductivity $\sigma$. For example, the magnetic permeability of the shield material 1302 may be varied between about 1.0 and about 10.0. The shield material 1302 is used primarily to block the radiation from the aggressor 908, while still allowing the intended electromagnetic emissions from the victim 906.

Graph 1320 illustrates the effect that adjusting the magnetic permeability has on the return loss of the victim 906, while graph 1330 illustrates the effect that adjusting the magnetic permeability has on the isolation between the victim 906 and the aggressor 908.

Figure 14:
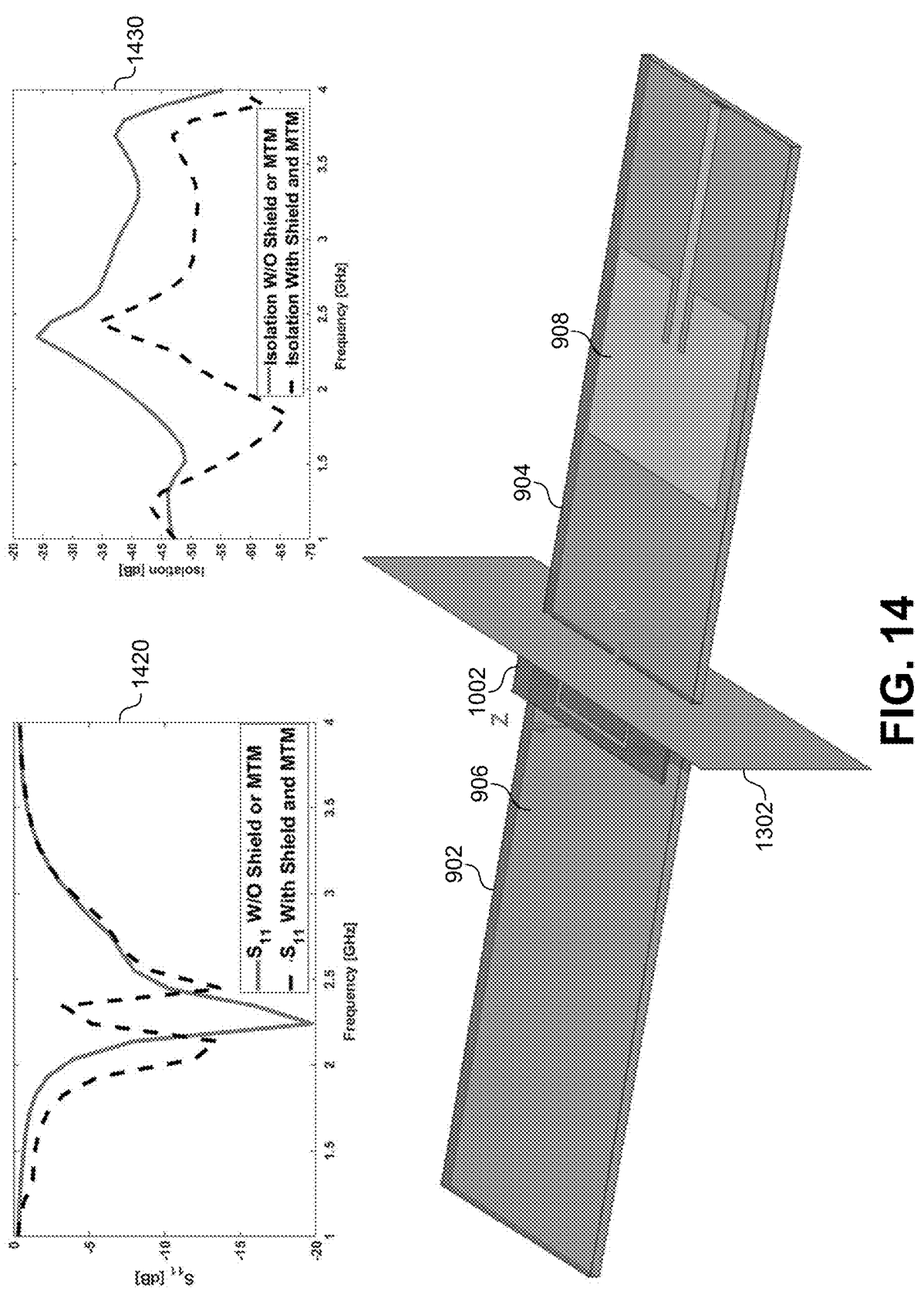
FIG. 14 illustrates a combination of the meta-material for the victim and the shielding material, according to some embodiments.

FIG. 14 illustrates a combination of the meta-material 1002 for the victim 906 and the shielding material 1302, according to some embodiments. Graph 1420 illustrates the return loss using both the shielding material 1302 for the aggressor 908 and the meta-material 1102 for the victim 906. Note that the return loss is minimized for the 2.4 GHz operating frequency of the antenna of the victim 906, while somewhat filtering out the surrounding frequencies in the operating range. Graph 1430 illustrates the isolation improvements that may be achieved using both the shielding material 1302 and the meta-material 1002.

Figure 15:
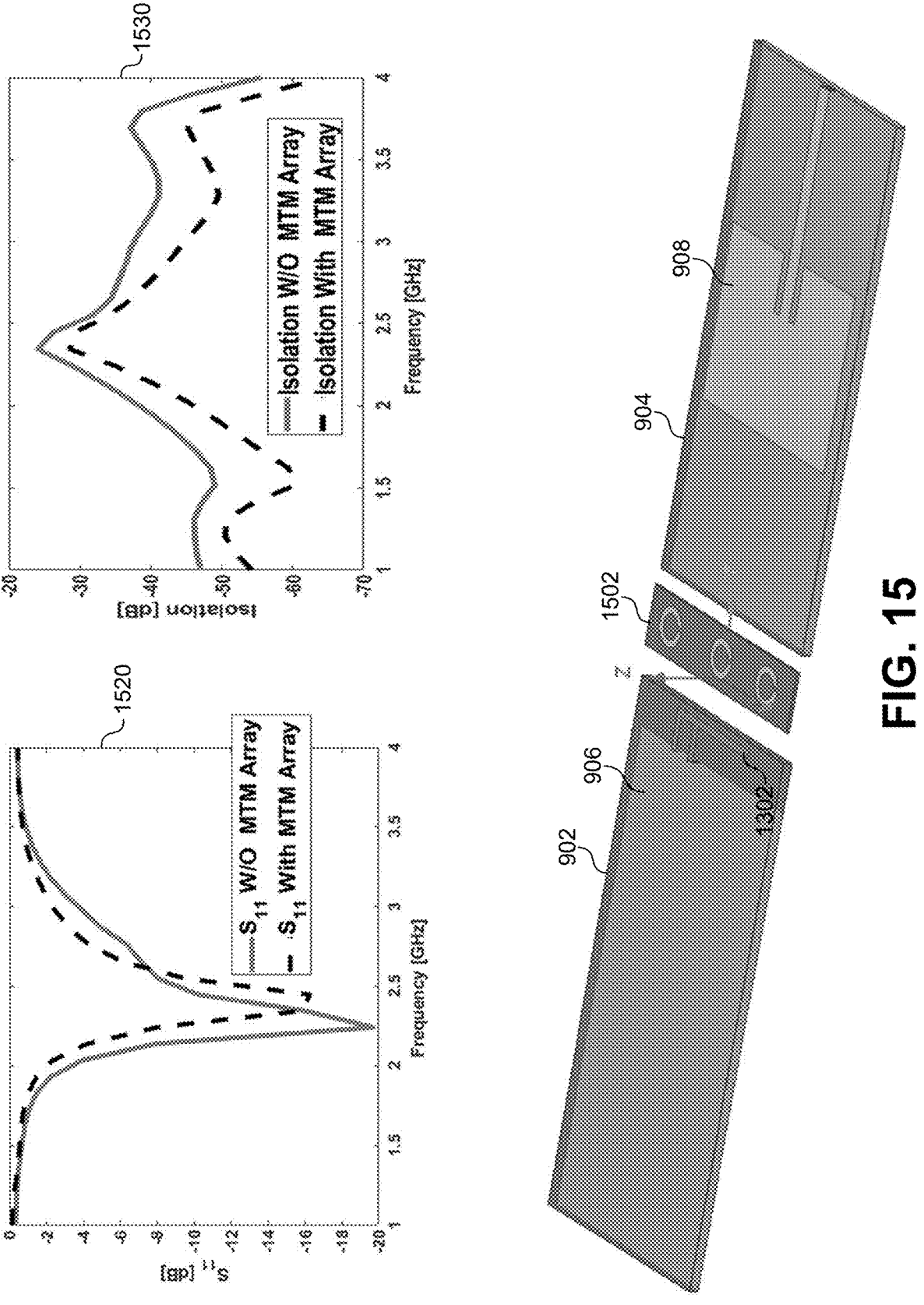
FIG. 15 illustrates a meta-material placed between the PCB of the victim and the PCB of the aggressor, according to some embodiments.

FIG. 15 illustrates a meta-material 1502 placed between the PCB 902 of the victim 906 and the PCB 904 of the aggressor 908, according to some embodiments. The placement of the meta-material 1502 may also be adjusted to tune the return loss and isolation characteristics of the system. Instead of placing the meta-material 1502 over the victim 906 or the aggressor 908 as shown in the figures above, the meta-material 1502 may be placed between the PCBs 902, 904. Graph 1520 illustrates the effect of the meta-material 1502 on the return loss, while graph 1530 illustrates the effect of the meta-material 1502 on the isolation.

FIGS. 9-15 illustrates various examples and combinations of different ways that meta-materials, shielding, and adjustable dielectric constants may be tuned in a circuit to maximize the isolation between an aggressor and a victim antenna. However, these examples are not meant to be limiting. It should be understood that any combination of these different techniques may be used in different geometries, configurations, and/or materials. Generally, a plurality of different aspects of the circuit may be controlled independently to achieve a combined result. The permeability of the magnetic material and/or the permeability of the meta-material structure may be adjusted for the antennas, the electrical conductivity and permeability of the shielding material may be adjusted, the magnetic permeability of the meta-material structure on the victim may be adjusted, and/or the dielectric constant, loss tangent, and permeability aspects of a dielectric material may be adjusted on the victim or aggressor sides.

Each of the methods described herein may be implemented by a computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 16:
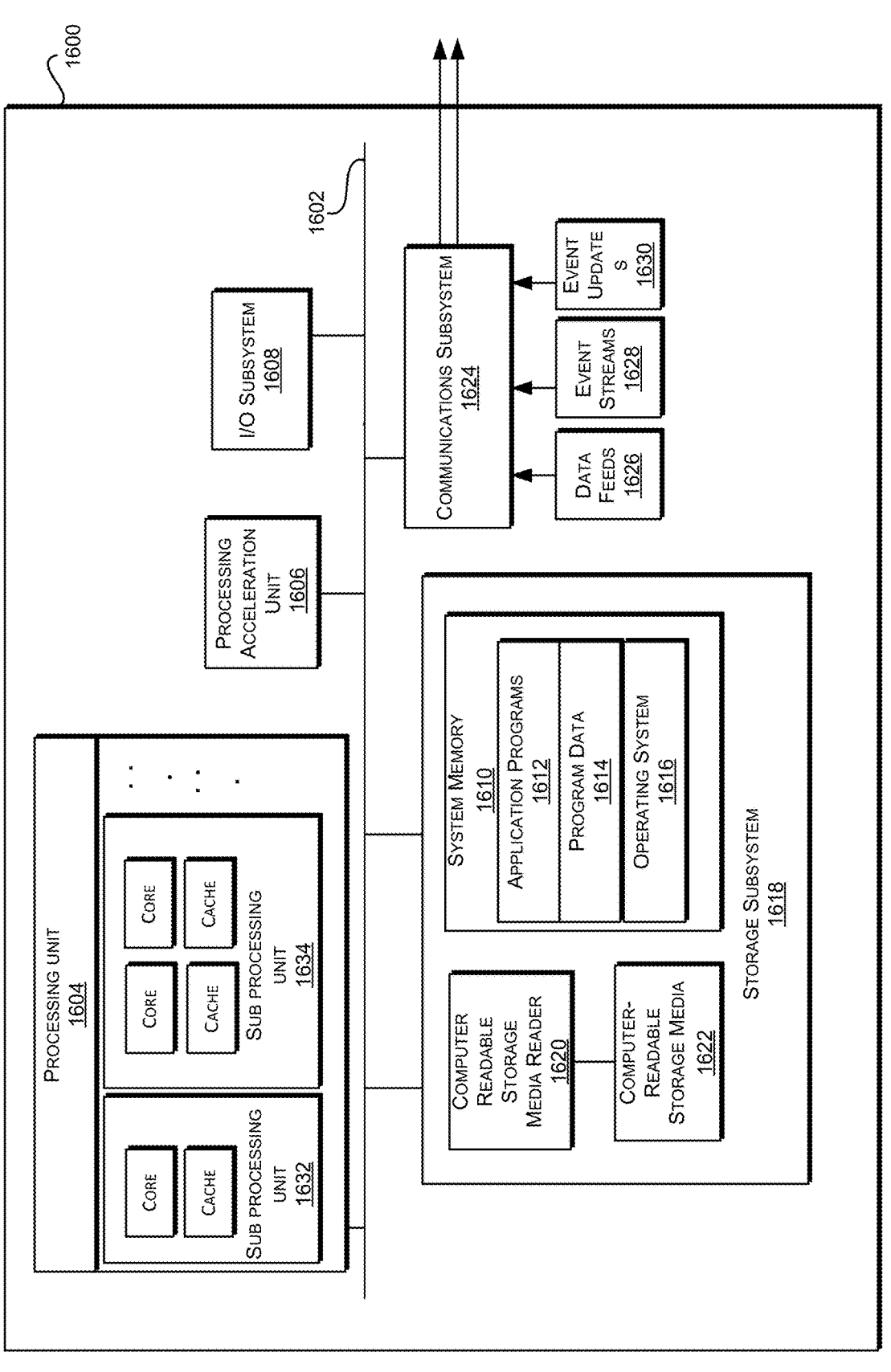
FIG. 16 illustrates an exemplary computer system, in which various embodiments may be implemented.

FIG. 16 illustrates an exemplary computer system 1600, in which various embodiments may be implemented. The system 1600 may be used to implement any of the computer systems described above. As shown in the figure, computer system 1600 includes a processing unit 1604 that communicates with a number of peripheral subsystems via a bus subsystem 1602. These peripheral subsystems may include a processing acceleration unit 1606, an I/O subsystem 1608, a storage subsystem 1618 and a communications subsystem 1624. Storage subsystem 1618 includes tangible computer-readable storage media 1622 and a system memory 1610.

Bus subsystem 1602 provides a mechanism for letting the various components and subsystems of computer system 1600 communicate with each other as intended. Although bus subsystem 1602 is shown schematically as a single bus, alternative embodiments of the bus subsystem may utilize multiple buses. Bus subsystem 1602 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1604, which can be implemented as one or more integrated circuits (e.g., a conventional microprocessor or microcontroller), controls the operation of computer system 1600. One or more processors may be included in processing unit 1604. These processors may include single core or multicore processors. In certain embodiments, processing unit 1604 may be implemented as one or more independent processing units 1632 and/or 1634 with single or multicore processors included in each processing unit. In other embodiments, processing unit 1604 may also be implemented as a quad-core processing unit formed by integrating two dual-core processors into a single chip.

In various embodiments, processing unit 1604 can execute a variety of programs in response to program code and can maintain multiple concurrently executing programs or processes. At any given time, some or all of the program code to be executed can be resident in processor(s) 1604 and/or in storage subsystem 1618. Through suitable programming, processor(s) 1604 can provide various functionalities described above. Computer system 1600 may additionally include a processing acceleration unit 1606, which can include a digital signal processor (DSP), a special-purpose processor, and/or the like.

I/O subsystem 1608 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1600 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1600 may comprise a storage subsystem 1618 that comprises software elements, shown as being currently located within a system memory 1610. System memory 1610 may store program instructions that are loadable and executable on processing unit 1604, as well as data generated during the execution of these programs.

Depending on the configuration and type of computer system 1600, system memory 1610 may be volatile (such as random access memory (RAM)) and/or non-volatile (such as read-only memory (ROM), flash memory, etc.). The RAM typically contains data and/or program modules that are immediately accessible to and/or presently being operated and executed by processing unit 1604. In some implementations, system memory 1610 may include multiple different types of memory, such as static random access memory (SRAM) or dynamic random access memory (DRAM). In some implementations, a basic input/output system (BIOS), containing the basic routines that help to transfer information between elements within computer system 1600, such as during start-up, may typically be stored in the ROM. By way of example, and not limitation, system memory 1610 also illustrates application programs 1612, which may include client applications, Web browsers, mid-tier applications, relational database management systems (RDBMS), etc., program data 1614, and an operating system 1616. By way of example, operating system 1616 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1618 may also provide a tangible computer-readable storage medium for storing the basic programming and data constructs that provide the functionality of some embodiments. Software (programs, code modules, instructions) that when executed by a processor provide the functionality described above may be stored in storage subsystem 1618. These software modules or instructions may be executed by processing unit 1604. Storage subsystem 1618 may also provide a repository for storing data used in accordance with some embodiments.

Storage subsystem 1600 may also include a computer-readable storage media reader 1620 that can further be connected to computer-readable storage media 1622. Together and, optionally, in combination with system memory 1610, computer-readable storage media 1622 may comprehensively represent remote, local, fixed, and/or removable storage devices plus storage media for temporarily and/or more permanently containing, storing, transmitting, and retrieving computer-readable information.

Computer-readable storage media 1622 containing code, or portions of code, can also include any appropriate media, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1600.

By way of example, computer-readable storage media 1622 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1622 may include, but is not limited to, Zip® drives, flash memory cards, universal serial bus (USB) flash drives, secure digital (SD) cards, DVD disks, digital video tape, and the like. Computer-readable storage media 1622 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1600.

Communications subsystem 1624 provides an interface to other computer systems and networks. Communications subsystem 1624 serves as an interface for receiving data from and transmitting data to other systems from computer system 1600. For example, communications subsystem 1624 may enable computer system 1600 to connect to one or more devices via the Internet. In some embodiments communications subsystem 1624 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1624 can provide wired network connectivity (e.g., Ethernet) in addition to or instead of a wireless interface.

In some embodiments, communications subsystem 1624 may also receive input communication in the form of structured and/or unstructured data feeds 1626, event streams 1628, event updates 1630, and the like on behalf of one or more users who may use computer system 1600.

By way of example, communications subsystem 1624 may be configured to receive data feeds 1626 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1624 may also be configured to receive data in the form of continuous data streams, which may include event streams 1628 of real-time events and/or event updates 1630, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1624 may also be configured to output the structured and/or unstructured data feeds 1626, event streams 1628, event updates 1630, and the like to one or more databases that may be in communication with one or more streaming data source computers coupled to computer system 1600.

Computer system 1600 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1600 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, other ways and/or methods to implement the various embodiments should be apparent.

In the foregoing description, for the purposes of explanation, numerous specific details were set forth in order to provide a thorough understanding of various embodiments. It will be apparent, however, that some embodiments may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of various embodiments will provide an enabling disclosure for implementing at least one embodiment. It should be understood that various changes may be made in the function and arrangement of elements without departing from the spirit and scope of some embodiments as set forth in the appended claims.

Specific details are given in the foregoing description to provide a thorough understanding of the embodiments. However, it will be understood that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, features are described with reference to specific embodiments thereof, but it should be recognized that not all embodiments are limited thereto. Various features and aspects of some embodiments may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In the foregoing description, for the purposes of explanation, numerous specific details were set forth in order to provide a thorough understanding of various embodiments. It will be apparent, however, that some embodiments may be practiced without some of these specific details. In other instances, well-known structures and devices are shown in block diagram form.

The foregoing description provides exemplary embodiments only and is not intended to limit the scope, applicability, or configuration of the disclosure. Rather, the foregoing description of various embodiments will provide an enabling disclosure for implementing at least one embodiment. It should be understood that various changes may be made in the function and arrangement of elements without departing from the spirit and scope of some embodiments as set forth in the appended claims.

Specific details are given in the foregoing description to provide a thorough understanding of the embodiments. However, it will be understood that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

What is claimed is:

1. A method of controlling noise on an electronic device, comprising:
   determining that a measured characteristic associated with an antenna on the electronic device violates a predetermined threshold, wherein the antenna is in a first configuration;
   identifying an aggressor, wherein:
      the aggressor comprises a component on the electronic device that emits electromagnetic (EM) radiation that causes the measured characteristic associated with the antenna to violate the predetermined threshold; and
      the aggressor is in a second configuration;
   determining one or more stimuli to apply to the antenna and/or the aggressor that causes the measured characteristic associated with the antenna to no longer violate the predetermined threshold, wherein the one or more stimuli are determined based on the first configuration and/or the second configuration; and
   applying the one or more stimuli to the antenna and/or the aggressor to change a physical shape or size of the antenna and/or the aggressor and thereby cause the measured characteristic associated with the antenna to no longer violate the predetermined threshold.

2. The method of claim 1 wherein the first configuration comprises a first location on the electronic device of the antenna and a tuner, and the second configuration comprises a second location on the electronic device of the aggressor, and an aggressor shielding material.

3. The method of claim 2 wherein a look up table (LUT) comprises data associated with the measured characteristic, the first configuration, and the second configuration.

4. The method of claim 1 wherein the measured characteristic comprises a signal-to-noise ratio (SNR) and applying the one or more stimuli causes a third configuration characterized by a shift in a direction of a signal emitted by the antenna which causes the SNR to no longer violate the predetermined threshold.

5. The method of claim 1 wherein the measured characteristic comprises a bit error rate check with a first success rate that violates the predetermined threshold due to an EM noise emitted from the aggressor and applying the one or more stimuli causes a third configuration characterized by an attenuation of the EM noise emitted from the aggressor, causing a second success rate of the bit error rate check that no longer violates the predetermined threshold.

6. The method of claim 1 wherein the measured characteristic comprises an EM field which causes interference with a radiative pattern associated with an operation of the antenna, and applying the one or more stimuli causes a third configuration characterized a shift in the radiative pattern which mitigates the interference to a level that no longer violates the predetermined threshold.

7. The method of claim 1 wherein the one or more stimuli is applied to the antenna.

8. A non-transitory computer readable medium comprising instructions that, when executed by one or more processors, cause one of more processors to perform operations comprising:

determining that a measured characteristic associated with an antenna on an electronic device violates a predetermined threshold, wherein the antenna is in a first configuration;

identifying an aggressor, wherein:

the aggressor comprises a component on the electronic device that emits electromagnetic (EM) radiation that causes the measured characteristic associated with the antenna to be below the predetermined threshold; and the aggressor is in a second configuration;

determining one or more stimuli to apply to the antenna and/or the aggressor that causes the measured characteristic associated with the antenna to meet or exceed the predetermined threshold, wherein the one or more stimuli are determined based on the first configuration and/or the second configuration; and applying the one or more stimuli to the antenna and/or the aggressor to change a physical shape or size of the antenna and/or the aggressor and thereby cause the measured characteristic associated with the antenna to no longer violate the predetermined threshold.

9. The non-transitory computer readable medium of claim 8 wherein the first configuration comprises a first location on the electronic device of the antenna and a tuner, and the second configuration comprises a second location on the electronic device of the aggressor, and an aggressor shielding material.

10. The non-transitory computer readable medium of claim 9 further comprising a data structure comprising data associated with the measured characteristic, the first configuration, and the second configuration.

11. The non-transitory computer readable medium of claim 10 wherein the data structure comprises a look-up table (LUT).

12. The non-transitory computer readable medium of claim 11 wherein the LUT comprises data associated with a material used to fabricate the antenna and the aggressor shielding material.

13. The non-transitory computer readable medium of claim 10 wherein the data structure is stored on a non-volatile memory device.

14. A system comprising:

an electronic device comprising:

an antenna in a first configuration;

an aggressor comprising a component on the electronic device that emits electromagnetic (EM) radiation and an aggressor shielding material;

a driver operable to apply one or more stimuli to a plurality of components on the electronic device;

a non-volatile memory device comprising a data structure, wherein the data structure comprises a plurality of characteristics associated with the antenna and one or more configurations; and one more processors configured to execute instructions comprising:

determining that a measured characteristic associated with the antenna on the electronic device violates a predetermined threshold;

identifying the aggressor, wherein:

the aggressor emits the EM radiation that causes the measured characteristic associated with the antenna to violate the predetermined threshold; and the aggressor is in a second configuration;

accessing data from the data structure, the data comprising information associated with the measured characteristic, the first configuration, and the second configuration;

determining one or more stimuli to apply to the antenna and/or the aggressor that causes the measured characteristic associated with the antenna to meet or exceed the predetermined threshold, wherein the one or more stimuli are determined based on the first configuration and/or the second configuration; and applying the one or more stimuli to the antenna and/or the aggressor to change a physical shape or size of the antenna and/or the aggressor and thereby cause the measured characteristic associated with the antenna to no longer violate the predetermined threshold.

15. The system of claim 14 wherein the aggressor shielding material is a smart material, comprising at least one of a shape-memory alloy, a piezoelectric material, a magnetic shape memory alloy (MSMA), and a smart inorganic polymer, wherein the smart material is characterized by a change in a shape and/or an electromagnetic property.

16. The system of claim 14 wherein the antenna is fabricated from a meta-material comprising at least one of a semi-conductor material, a ferromagnetic material, and a phase-change material.

17. The system of claim 16 wherein the meta-material, in response to the one or more stimuli, forms a third configuration characterized by change in an electromagnetic property of the antenna.

18. The system of claim 14 further comprising a tuner configured to change an impedance and/or an aperture of the antenna.

19. The system of claim 18 wherein the tuner comprises a microelectromechanical (MEMS)-actuated tuner.

20. The system of claim 19 wherein the MEMS-actuated tuner comprises an electrostatic MEMS actuator.

\* \* \* \* \*